US012465857B2

(12) United States Patent
Polney et al.

(10) Patent No.: US 12,465,857 B2
(45) Date of Patent: Nov. 11, 2025

(54) SYSTEMS AND METHODS OF PROCESSING PLAYER INTERACTIONS IN A MULTIPLAYER VIRTUAL GAME SPACE

(71) Applicant: NINTENDO CO., LTD., Kyoto (JP)

(72) Inventors: Chris Polney, Redmond, WA (US); Kees Luyendijk, Redmond, WA (US); Daisy Pigeon, Redmond, WA (US); Ryan Garvan, Redmond, WA (US); Carlie Olson, Redmond, WA (US); Jonathan Johnson, Redmond, WA (US); Rory Johnston, Redmond, WA (US); Hitomi Koda, Kyoto (JP); Yoshiaki Koizumi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 188 days.

(21) Appl. No.: 18/461,061

(22) Filed: Sep. 5, 2023

(65) Prior Publication Data

US 2025/0073591 A1 Mar. 6, 2025

(51) Int. Cl.

| | |
|---|---|
| ***A63F 13/53*** | (2014.01) |
| ***A63F 13/44*** | (2014.01) |
| ***A63F 13/52*** | (2014.01) |
| ***A63F 13/577*** | (2014.01) |
| ***A63F 13/69*** | (2014.01) |

(Continued)

(52) U.S. Cl.

CPC ............ *A63F 13/577* (2014.09); *A63F 13/44* (2014.09); *A63F 13/52* (2014.09); *A63F 13/69* (2014.09); *A63F 13/803* (2014.09); *A63F 13/5378* (2014.09)

(58) Field of Classification Search

CPC ........ A63F 13/25; A63F 13/40; A63F 13/426; A63F 13/45; A63F 13/50; A63F 13/537; A63F 13/55; A63F 13/56; A63F 13/57; A63F 13/58; A63F 13/52; A63F 13/577; A63F 13/44; A63F 13/69; A63F 13/803; A63F 13/5378; A63F 2300/30; A63F 2300/303; A63F 2300/55; A63F 2300/60; A63F 2300/64; A63F 2300/643; A63F 2300/65

See application file for complete search history.

(56) References Cited

U.S. PATENT DOCUMENTS

2020/0298130 A1* 9/2020 Lai .......................... A63F 13/57
2023/0101707 A1* 3/2023 Smith ..................... A63F 13/35 463/42

(Continued)

OTHER PUBLICATIONS

Nintendo "Super Mario Bros. 35," Published Oct. 1, 2020, <https://www.nintendo.com/en-za/Games/Nintendo-Switch-download-software/Super-Mario-Bros-35-1832227.html>.

(Continued)

*Primary Examiner* — Omkar A Deodhar
(74) *Attorney, Agent, or Firm* — Nixon & Vanderhye P.C.

(57) ABSTRACT

A computer system is provided that enables players to play an online multiplayer game. When collisions are detected in the game, energy objects are created. These objects may be acquired by players during the game to increase a special ability meter. Activation of the special ability meter allows players to be provided with one or more benefits during the multiplayer video game. In some examples, the benefit may include moving a player object to a second track within the multiplayer racing game.

20 Claims, 13 Drawing Sheets

(51) Int. Cl.
*A63F 13/803* (2014.01)
*A63F 13/5378* (2014.01)

(56) References Cited

U.S. PATENT DOCUMENTS

| | | | | |
|---|---|---|---|---|
| 2023/0249074 | A1* | 8/2023 | Wurman | A63F 13/803<br>463/6 |
| 2024/0286033 | A1* | 8/2024 | Lv | A63F 13/422 |

OTHER PUBLICATIONS

Nintendo “Tetris 99,” Published Feb. 13, 2019, <https://www.nintendo.com/us/store/products/tetris-99-switch/.

* cited by examiner

SYSTEMS AND METHODS OF PROCESSING PLAYER INTERACTIONS IN A MULTIPLAYER VIRTUAL GAME SPACE

CROSS REFERENCE(S) TO RELATED APPLICATION(S)

This application is one of two related applications, all filed on the same date herewith; this application incorporates by reference the entire contents of the other application. The two related applications are U.S. patent application Ser. No. 18/461,061; and U.S. patent application Ser. No. 18/461,092.

TECHNICAL OVERVIEW

The technology described herein relates to multiplayer video game systems in which players interact with one another within a virtual space. More particularly, the technology described herein relates tracking interactions within a virtual space of a multiplayer video game—including collisions between players.

INTRODUCTION

Multiplayer video games that support online multiplayer can be challenging to implement due to problems such as network latency, packet loss, and other considerations that can result in varied experiences for each player. These technical considerations can be further complicated depending on the various features included in the multiplayer game that the players on each computing device interact with during the game.

Accordingly, it will be appreciated that new and improved techniques, systems, and processes are continually sought after in these and other technical areas.

SUMMARY

In certain example embodiments, a multiplayer game system is provided that allows for each client to simulate aspects of a multiplayer game. Updates are communicated between clients and a server.

In certain example embodiments, energy objects are generated and placed into the multiplayer game. Players in the multiplayer game may acquire these objects to increase a value of a parameter for a special ability. In some examples, the energy objects are generated based on determination of a collision between player-controlled objects. These objects may be acquired by players during the game to increase a special ability meter. Activation of the special ability allows players to be provided with one or more benefits during the multiplayer video game. In some examples, the benefit may include moving the player-controlled to a second track within a multiplayer racing game. The track and/or the player-controlled object may then be provided with benefits in the racing game for a period time. In some examples, the period of time that the ability is active is based on a placement of the player-controlled object within the race. In some examples, the higher the placement the shorter the period of time.

In certain examples, the creation and/or acquisition of energy objects is handled by each client without being synchronized to a server or host computer system. In some examples, the generation of energy objects on the various clients that participate within the multiplayer game may be different. This may be due to variations in how each client simulation is processed and/or that the creation of such objects is not communicated/synchronized to a host.

In certain example embodiments, each player is assigned smaller subset of players within a larger multiplayer game as Rivals each time the player participates within the multiplayer game. The Rivals for each player are tracked and displayed differently to respective players during the multiplayer video game. A player's skill rating is tracked based on the results in comparison to the selected Rivals.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Figure 1:
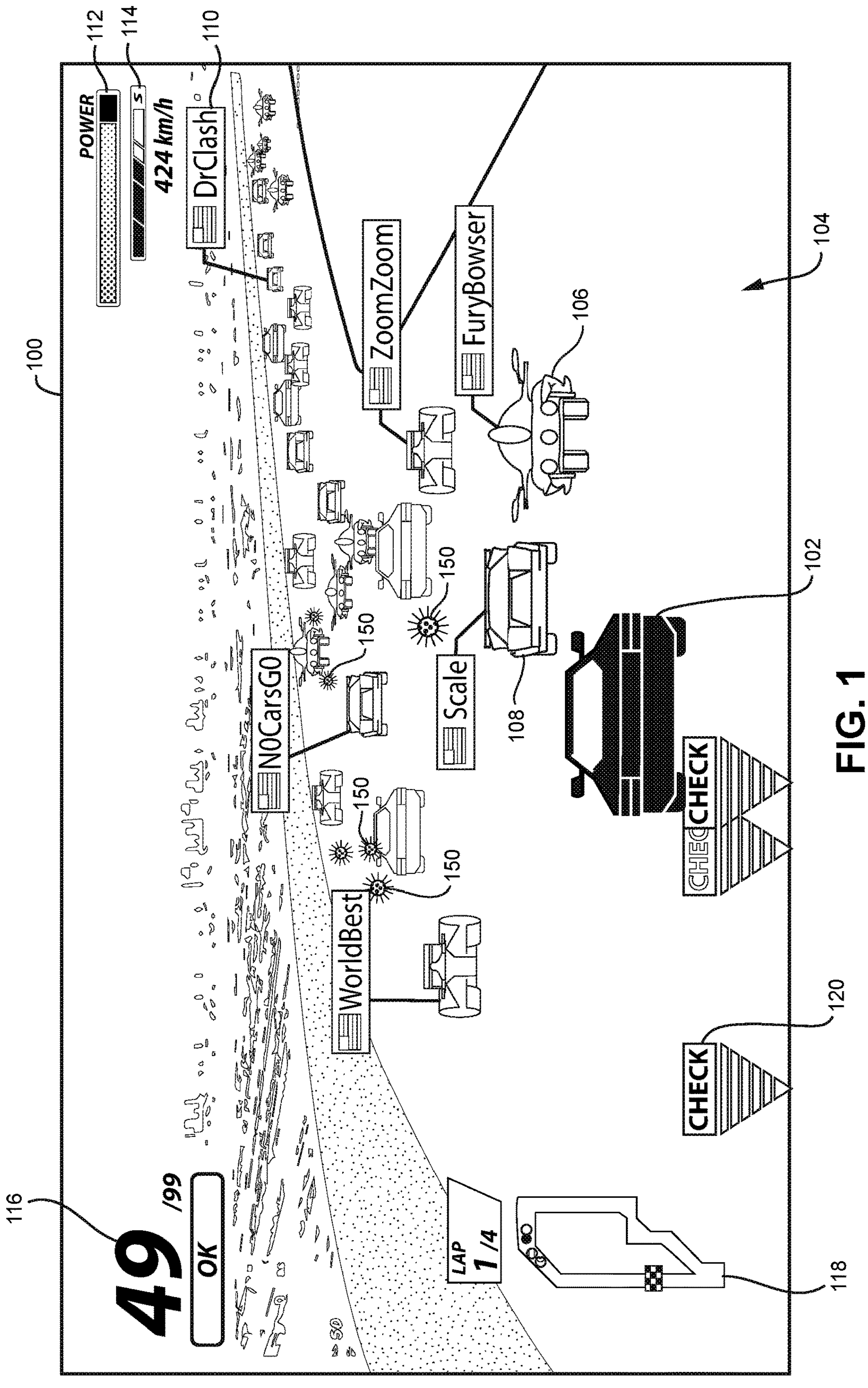
FIG. 1 is a wireframe view of a multiplayer video game according to certain example embodiments.

In many places in this document, including but not limited to the description of FIG. 1, software modules, software components, software engines, and/or actions performed by such elements are described. This is done for ease of description; and it should be understood that whenever it is described in this document that a software module or the like performs any action, the action is in actuality performed by underlying hardware elements (such as a processor, hardware circuit, and/or a memory device) according to the instructions that comprise the software module or the like. Further details regarding this are provided below in, among other places, the description of FIG. 13.

Figure 6:
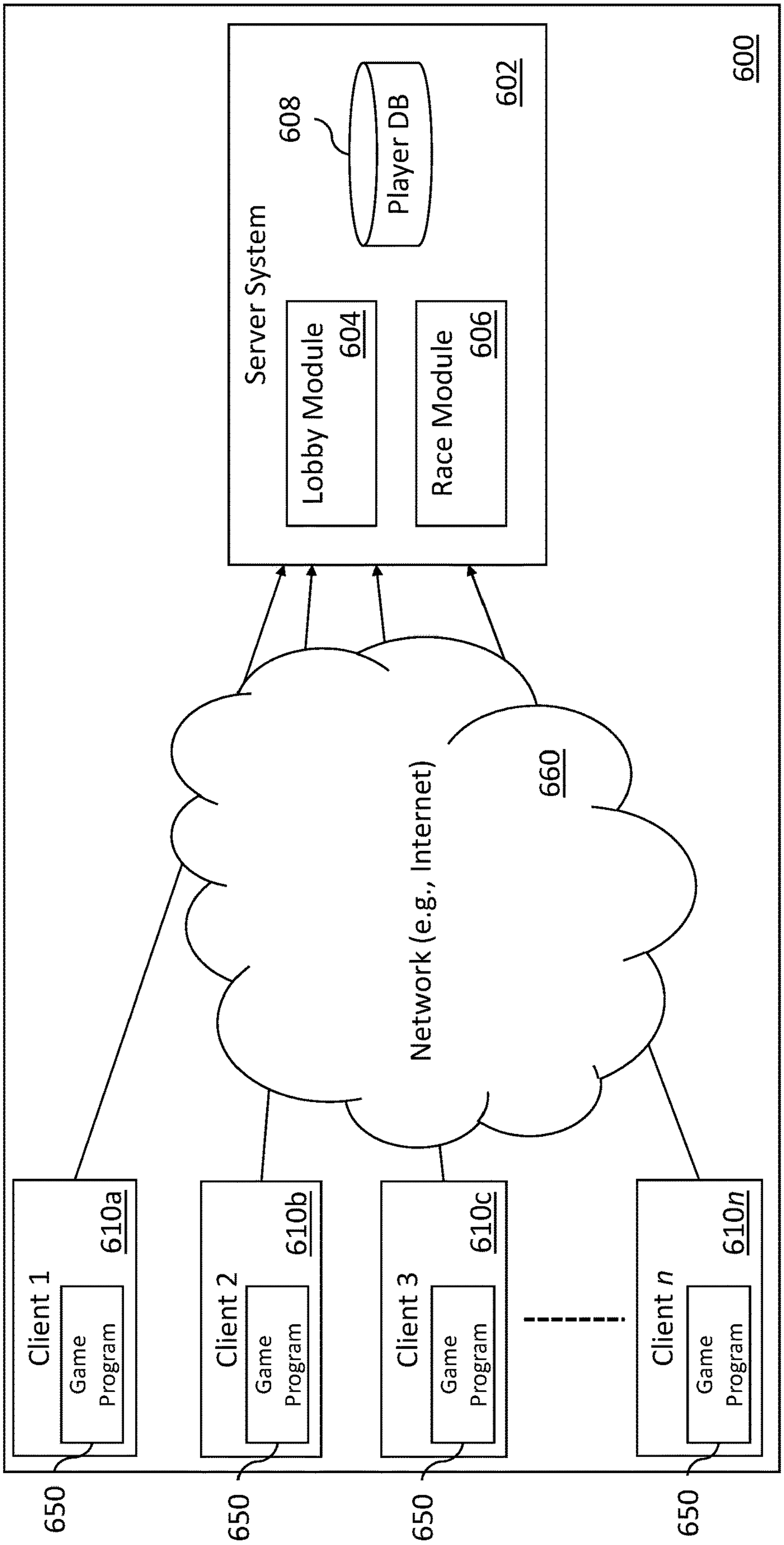
FIG. 6 is a system diagram that illustrates how the multiplayer video game shown in FIG. 1 may be implemented using a client-server architecture according to certain example embodiments.

Some reference numbers are reused across multiple Figures to refer to the same element; for example, the server system 602 first shown in FIG. 6 is also referenced and described in connection FIG. 7, FIG. 8, and others.

Overview

In certain example embodiments, an online multiplayer racing game is provided. Tens or even a hundred or more different users may participate in the race in certain examples. The users compete within a virtual space (e.g., a virtual game space) as they control their respective player-controlled objects (e.g., which may be referred as a "vehicle" elsewhere herein) around a track that is located within the virtual space. Each user operates their own computing device as a client that communicates (e.g., via the Internet or other electronic data network) with a server or other host computer system that provides communication updates to the clients that are participating in the multiplayer game. In certain examples, each player in the race is assigned a smaller subset (e.g., 4 out of 100 different competitors) as Rivals.

In some examples, energy objects are generated and placed onto the track when collisions between vehicles are determined. In some examples, the vehicles in the race can obtain these energy objects to charge up or increase special ability meter. When the special ability meter is charged, the player may activate a special ability.

In some example embodiments, the race may include two or more different tracks that a player can move their vehicles between during the race. The different tracks may be designed differently and may include different features. For example, a first track may be more difficult (e.g., include more obstacles, turns, or the like) while a second track may be straighter, easier to navigate, etc. In some examples, the special ability can be activated (e.g., by the player) that allows their vehicle to transfer to another track.

In many places in this document, software (e.g., modules, software engines, services, applications and the like and actions (e.g., functionality) performed by software are described. This is done for ease of description; it should be understood that, whenever it is described in this document that software performs any action, the action is in actuality performed by underlying hardware elements (such as a processor and a memory device) according to the software and the instructions comprised therein. In some examples, functionality that is provided within software may, in some embodiments, be provided in the form of firmware and/or hardware implementations. Further details regarding this are provided below in, among other places, the description of FIG. 13.

Description Of FIGS. 1-5: Illustrative Examples

FIGS. 1-5 are wireframe views (100, 200, 300, 400, and 500) showing different aspects of an example multiplayer video game. As shown in these Figures, a race game is used as an example of the multiplayer video game that may be implemented in certain example embodiments. While the techniques herein are discussed in connection with an example racing game, they may also be applied to other types of games that involve multiple players. In certain examples, the techniques may also be applied in single player games.

In certain example embodiments, the illustrative racing game discussed herein allows tens or even a hundred or more users to participate and compete within the same virtual space. FIG. 1 is a wireframe view 100 of an image that is generated as part of an online multiplayer racing game where users race against one another around the track 104 that is in the virtual game space. The images (including image 100) may be generated by a computing device 1300 that is used by a user to participate in the multiplayer video game. The generated images may be displayed on display device 1312 that is coupled to the computing device 1300.

View 100 includes heads up display elements (discussed below) that are part of or overlaid with a rendered view of the virtual game space that includes track 104, a player-controlled virtual object 102 that is controlled by a player playing the multiplayer video game on the computing device 1300 on which the local simulation is executing (and a user providing input thereto), and additional virtual objects.

The track within the virtual game space may include various obstacles, jump pads, speed boost areas (e.g., 410 in FIG. 4) and the like. In general, the multiplayer game may be played by having players race around a given track multiple times.

Additional virtual objects may include virtual objects 106 and 108 that may be controlled by other players (described elsewhere herein) or may be non-player-controlled objects (also called "NPCs" herein).

In the example shown in FIG. 1, vehicles shown in the race may be controlled by other users using their own computing device 1300. Player-controlled objects may be differentiated from non-player-controlled objects due to player-controlled objects being responsive to input from a corresponding player. In contrast, the movement, actions, etc. of non-player-controlled objects may be controlled with a computer program, script, or other data (e.g., programmatic control) without relying on input from a user. In some examples, the control of such non-player-controlled objects may be handled by respective clients and/or via software executing on the server system, which then communicates how the NPCs should be controlled.

In some examples, a vehicle that is participating in a race may be an NPC vehicle. For example, if there are 50 vehicles in a race, 10 may be NPC vehicles. NPC vehicles may be referred to as AI players herein. Indeed, in instances where another player is described within the game, that other player may be an AI player, or may be a player that is controlled by a user of another computing device. From the perspective of each user that is controlling their own respective vehicle 102, whether another vehicle is ultimately controlled by another user or is an AI player may be indistinguishable. In some examples, NPC vehicles/AI players may be identified as such (e.g., via the name they use, or how they are identified within the game). As discussed below, in certain examples and in some instances, one or more Rivals in a multiplayer game may be NPC vehicles.

Note that for ease of description, the term "vehicle" is used interchangeably with object, player-controlled object, and other virtual objects that may be located with the virtual game space discussed in connection with the illustrative examples herein. It will be appreciated, however, that different types of objects may be used according to certain examples. For example, the player-controlled object may be a player character or a non-vehicle object (e.g., a horse, dinosaur, or other type of animal). In general, a player-controlled object is an object for which a user provides input (e.g., via input device 1314 of FIG. 13) to control on or more attributes (e.g., direction, speed, abilities, such as a special power, and the like) of the corresponding player-controlled object. In certain example embodiments, and as discussed elsewhere herein, player-controlled objects may include objects that are computer controlled (such as by the server)—these players may be referred to as AI players.

Another type of virtual object that may be included in the virtual game space includes a spark object 150. Multiple spark objects 150 are shown in FIG. 1. These objects may be acquired by players during the game and may be generated based on collisions between vehicles, special NPC objects, and other sources. Additional details regarding the spark object are provided below.

The multiplayer racing game that is shown and discussed herein is implemented with a three-dimensional virtual space. However, it will be appreciated that while certain examples herein are discussed in the context of three-dimensional virtual spaces, that the techniques may be applied to games that are in other than virtual 3-dimensional space. For example, a multiplayer video game with 2 dimensions (e.g., a side-scroller or the like that has little or no z-axis) may be implemented in certain example embodiments.

Returning to image 100 shown in FIG. 1, the image may include heads-up display elements that are provided to the user (e.g., to provide additional information content to the user playing the video game). These heads-up display elements may include, for example, a display element 116, a power meter 112 (or health meter), a charge meter 114 for a special ability, mini-map icon 118, check icons 120, an indicator of the speed the player-controlled object is moving in the race (424 km/h in the FIG. 1 example), etc.

Display element 116 is used to show the ranking of the player-controlled object 102 within the race (i.e., position 49 out of 99 positions within the race). In some examples, display element 116 may include additional information that displays the current race if there are multiple different races (e.g., as part of a racing circuit competition).

In some examples, display element 116 may also include a notification (e.g., "OK") can be used to indicate whether or not the player and their vehicle 102 is within a cut line that is used over a series of races (or laps). If the player is within the cut line, then they are positioned to advance to a subsequent race, if they are outside the cut line, then they may not advance to the next race. In some examples, the cut line may be used on a per lap basis (e.g., each lap or every other lap, etc.) of a race. In such cases, the player and their vehicle may be removed from the race if they are not within a cut line. As an example, a cut line may be set at 70 (so the top 70 players advance). If a cut line of the top 70 is used, then the OK notification is displayed. Otherwise, another notification that indicates the player is below the cut line may be displayed.

Power meter 112 shows a graphical indication of a health attribute of the vehicle. This is used to provide an indication of health or durability of the vehicle to the user. In certain examples, the health of a vehicle may be decreased when the vehicle collides with another vehicle in the race. In some examples, the health meter may also be used to temporarily boost the top speed of the vehicle within the race (e.g., a turbo boost). In some examples, while the boost ability is active, the health of the vehicle may be gradually depleted.

Charge meter 114 is used to indicate a level of charge of a special ability parameter. When the meter is fully charged, then the player may activate/trigger a special ability. This is discussed in more detail in connection with FIGS. 9 and 11.

The mini-map 118 shows a miniature version of the racecourse and may, in some examples, separately identify (e.g., by color, shading, icon etc.) where the player-controlled object is in the race, where any rivals are located, which object is in first place, etc. Different vehicles (non-player-controlled vehicles, rivals, the player-controlled vehicle, other player-controlled vehicles, etc.) may be identified differently by using different colors, shadings, or other visual indicators. For example, the icon in the mini map that corresponds to vehicle 102 may be green, non-player objects gray, rivals red, and other player vehicles blue. In some examples, and as shown and discussed in greater detail in connection with FIG. 5, there may be multiple mini maps that are displayed.

Check icons 120 is used to indicate to a player when other vehicles within a race are behind vehicle 102. In some examples, the icons may flash or blink as a vehicle moves "closer" to the player-controlled object 102. In some examples, different animations or colors may be used to indicate if the vehicle behind is moving closer or further away. In some examples, check icons 120 can be displayed differently for those vehicles that are Rivals to the current player.

In some examples, the heads-up display elements may include player icons 110 that identify the player associated with other player vehicles within the race. In some instances, player icons 110 may be, for example, the player name associated with the user controlling the corresponding vehicle. NOCarsGO, ZoomZoom, FuryBowser, Scale, DrClash, and WorldBest are examples icons that display the usernames or player names of the other players that control vehicles within the race shown in FIG. 1. In some examples the icons may include the flag associated with where that user is playing the multiplayer video game. In some examples, a virtual object that is labeled with an icon may be a non-player-controlled object. In some examples, each object that is participating in the race may be identified by a corresponding icon. As an example, each of the vehicles may, in some examples, have a corresponding icon that identifies the player (or type of object) associated with that vehicle. In some examples, a subset of the vehicles in a race may have a correspondingly displayed player icon. For example, the object that is leading the race (e.g., "NiftyFan" in FIG. 5) and the five objects closest to the position of the player-controlled object 102 within the race may be displayed. In certain examples, and as discussed in greater detail in connection with FIG. 5 and other figures, each of the Rivals of the current player may be automatically displayed so as to identify where the vehicles for those Rivals are located within the race. Such functionality can allow users to more easily recognize where their Rivals are within a race.

Figure 2:
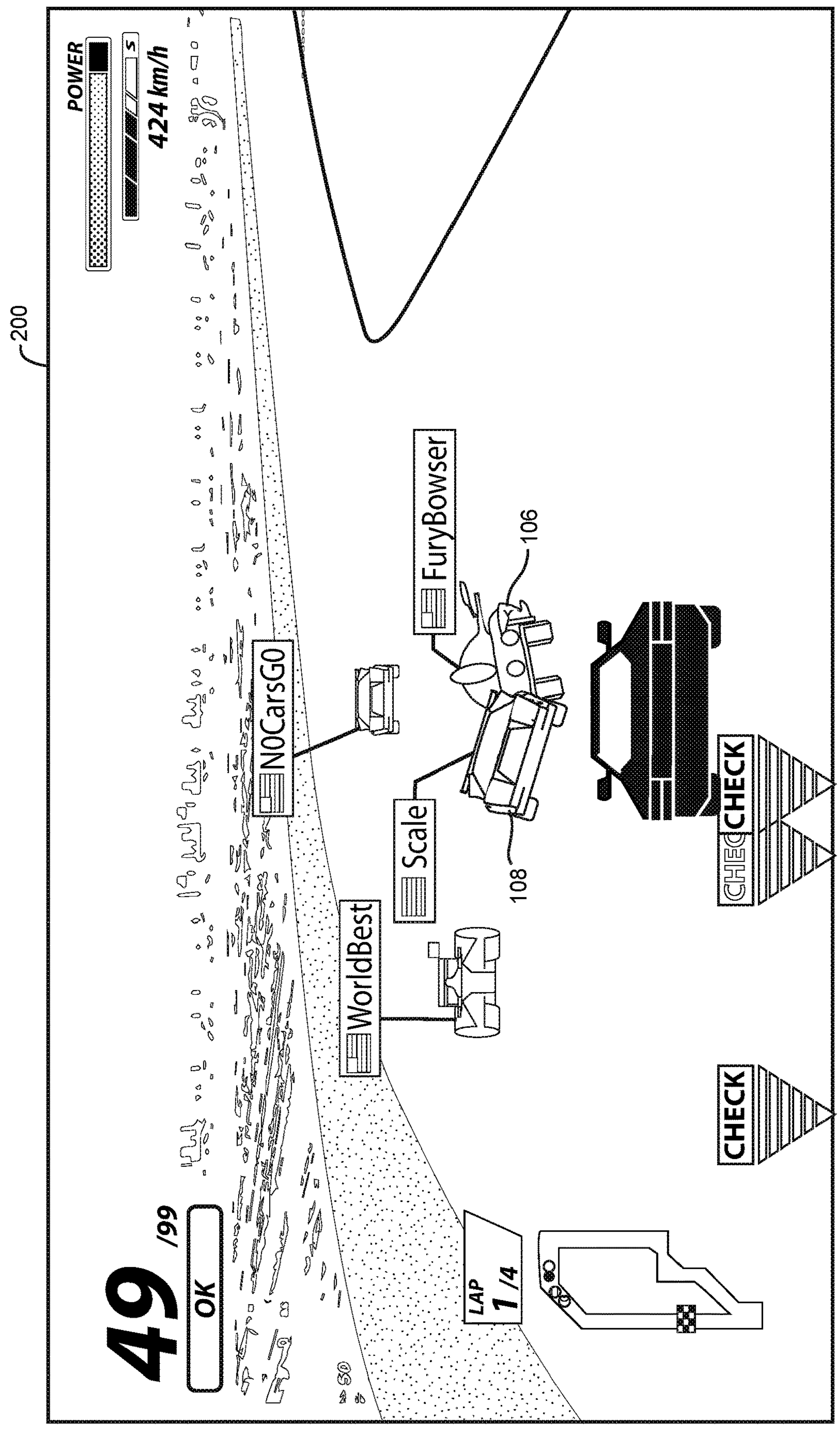
FIG. 2 is a wireframe view of the multiplayer video game of FIG. 1 that shows determination of two player cars colliding with one another according to certain example embodiments.

FIG. 2 is a wireframe view 200 of the multiplayer video game of FIG. 1 that shows two different player-controlled objects (controlled by different users using different clients) colliding with one another according to certain example embodiments. In certain examples, and as discussed in greater detail in connection with FIG. 9, determination of a collision (e.g., collision detection processing) between two (or more) vehicles (or other objects within the virtual space) may be performed locally by each game program executing on a corresponding client. In some examples, however, such collisions may be determined by the server system 602, or both one or more clients and the server system 602. When such a collision is determined, a virtual object may be generated and dynamically placed into the virtual space (e.g., on the track at the position of the detected collision).

Figure 3:
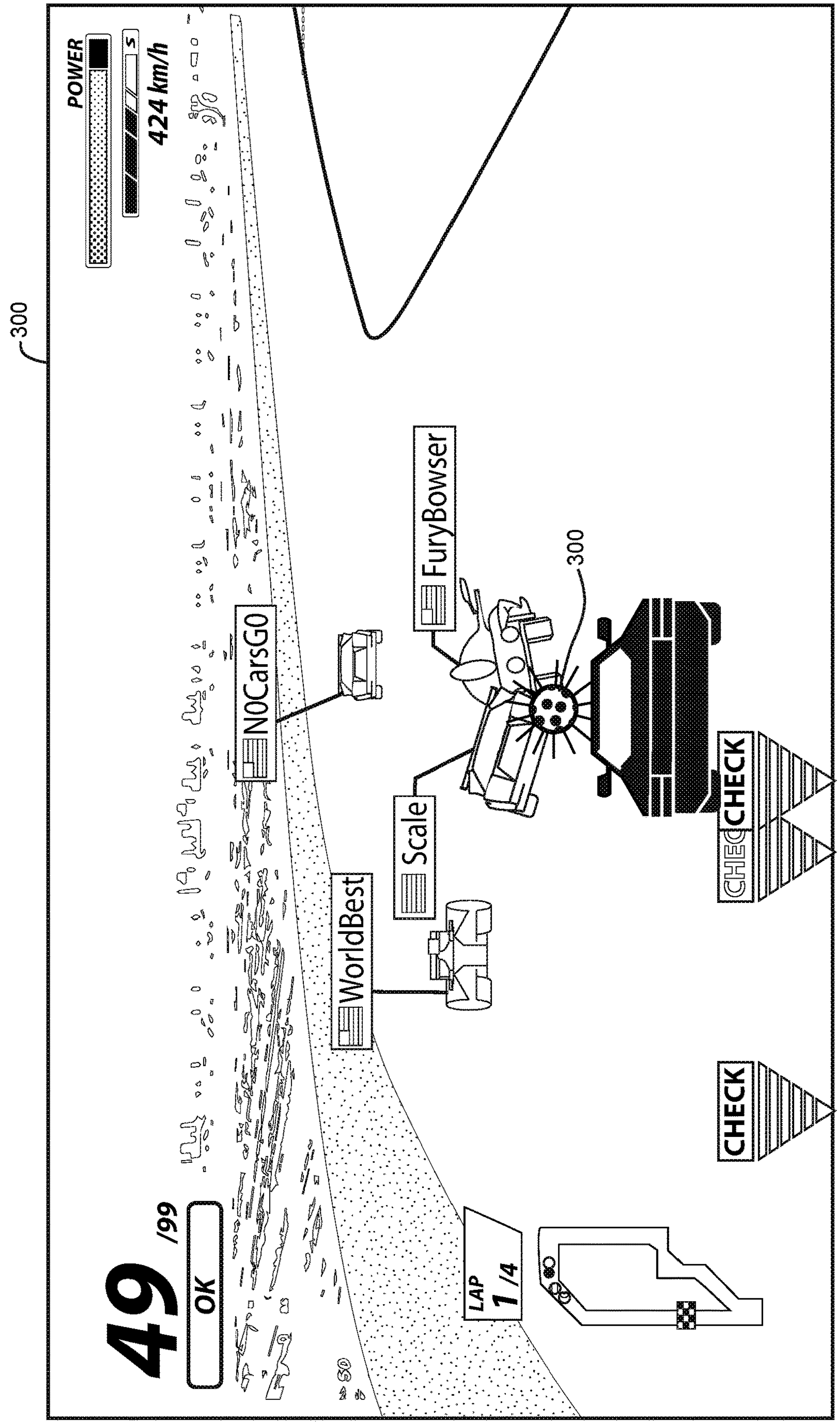
FIG. 3 is a wireframe view of the multiplayer video game of FIG. 1 that shows generation of an energy object based on determination of the collision shown in FIG. 2 according to certain example embodiments.

FIG. 3 is a wireframe view 300 of the multiplayer video game that shows a frame of the game that occurs after a collision is detected as shown in FIG. 2. When such a collision occurs, an energy object 300 is generated. The energy object 300 is another instance of the energy objects 150 shown in FIG. 1. When the energy object 300 is generated is then placed at, near, or otherwise based on the location of the detected collision within the virtual space. Additional details regarding the generation and processing for the energy objects are discussed in connection with, for example, FIG. 9.

In certain example embodiments, players can control their vehicle 102 to collect energy objects that have been placed on the track. Each time one of these energy objects is collected it may increase the value of a tracked parameter for the player (or the vehicle of that player). Special ability meter 114 is used to graphically represent a current value for the tracked parameter for player-controlled object 102. When the value for the tracked parameter reaches a threshold value, the player may activate a special ability for the player-controlled object. Different types of special abilities may be implemented according to certain example embodiments and may include: 1) increasing the speed of the vehicle; 2) allowing the vehicle to fly (e.g., without strictly following the path of the track); 3) transitioning to another track (e.g., track 404); 4) making the vehicle invulnerable); and other options that may affect the vehicle, other vehicles, or the race.

Activation of the special ability may be provided in order to give players in the race a way to catch up to the leaders of the race (e.g., come from behind to win the race). This ability may give players in lower positions in the race an advantage over those in higher positions. This may be because that vehicles at higher positions may have less opportunity to acquire energy objects (because they are the result of collisions). In some examples, NPC objects may be designed to not appear or drop energy objects to those in the front of the race.

Figure 4:
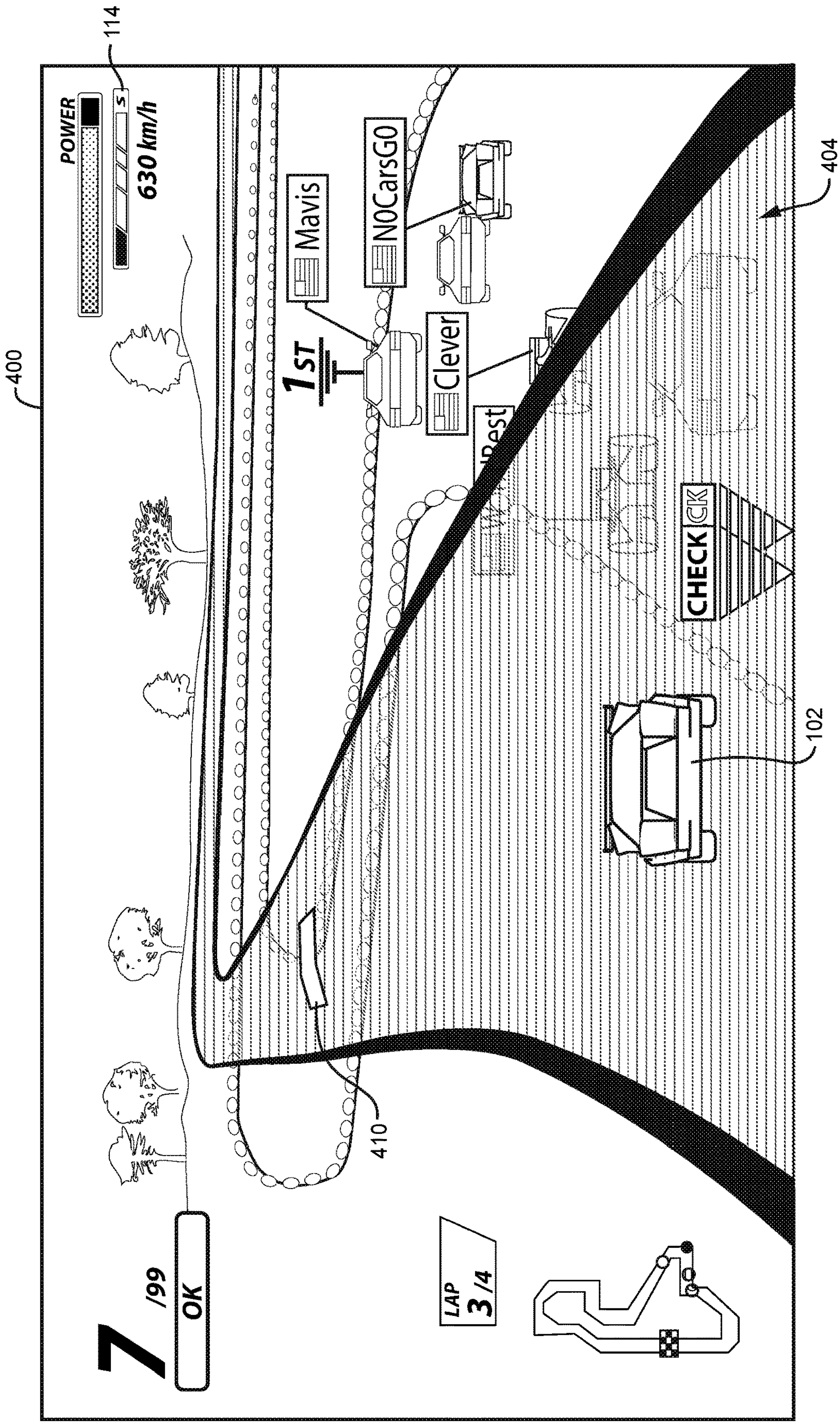
FIG. 4 is a wireframe view of the multiplayer video game of FIG. 1 that shows a player-controlled car using a second track according to certain example embodiments.

FIG. 4 is a wireframe view 400 of the multiplayer video game of FIG. 1 that shows a player-controlled object that has activated the special ability and is using a second track 404 that is different from the first track 104. As noted above, an illustrative example for implementation of the special ability is transferring the player-controlled object to a second track. While on second track 404, the player may be provided with a view of the other vehicles that are still on the first track. The second track 404 may generally follow the path of the first track but may be less complex and/or take a more advantageous route for the race. For example, and as shown in FIG. 4, the second track does not include the turn that the first placed vehicle labeled "Mavis" is about to take on the first track 104. Rather, track 404 includes a long straightaway that cuts the corner of the turn that is included are part of track 104.

While the vehicle 102 is on the second track, there may be one or more advantages imparted to the vehicle 102. In certain example embodiments, a parameter or attribute for the vehicle 102, or how that parameter or attribute is controlled, may be changed based on the vehicle being on the second track. For example, the top speed (or other speed/movement attribute) of the vehicle may be increased or changed in comparison to when the vehicle was on the first track 104. As shown in FIG. 4, the top speed of vehicle 102 is 630 kph and has been increased from a top speed of 424 kph in FIG. 3. In certain examples, this increase may be a percentage increase from the top speed allowed on the first track (also called the "main" or "primary" track herein) or may be a top speed that is associated with the particular second track. In certain example embodiments, different tracks may have different top speeds associated with a corresponding track—or a type of corresponding track.

In certain example embodiments, using the second track may provide alternative or additional advantages for the player and/or their vehicle. As another example, control of the vehicle may be easier for the user—e.g., in the form of steering assistance for controlling the vehicle. For example, inputs provided by the user to control the vehicle may be more responsive. In some examples, movement of the vehicle may be biased towards a centerline of the second track. The centerline of the second track may be predefined (e.g., in the world space in which the track is located) and provide a biasing of control of the vehicle moving on the second track to be towards the center. As an illustrative, non-limiting example, when the game state of is updated (e.g., as discussed in FIG. 9) based on input provided from the user, an additional force vector may be applied towards the centerline of the second track. In contrast, no such biasing (or less of a biasing) may be present on the main track. Such processing may allow users greater "control" over their vehicles as they proceed along the second track. In certain examples, the vehicle may not take damage from collisions while on the second track. In some examples, the setup or geometry of the second track may be different than the first track (e.g., not contain not as many turns, be shorter (e.g., a shortcut), have more speed boosts 410, be straighter, etc.).

Another advantage of using the second track in certain examples is that the health of the vehicle (e.g., 112) may be fixed and that no further damage to the vehicle may be performed while the vehicle is on the second track. In certain examples, when a vehicle is on the second track crashing out of the race (e.g., do to losing all health or durability) may be prevented. In certain example embodiments, the health of the vehicle (e.g., 112) may be gradually increased as long as the vehicle remains on the second track. Another advantage of the second track may be that there are no other vehicles (or fewer vehicles) using the second track in comparison to the first track. In certain examples, when a vehicle activates the second track, that second track may be exclusive to that client. In other words, even if multiple other vehicles are using the second track at the same time during the race, they may not see each other (even if they are at the same or similar position in the race). The other vehicles on the second track may not be rendered by that client and no collision processing with those other vehicles may be performed. This approach may allow players to control their vehicle more easily on the second track (e.g., as they do not need to drive around other vehicles). Note that as shown in FIG. 4, vehicles that are on the second track may be visible to those on the first track and vice versa.

Additional details regarding the use of a second track and the processing involved in connection with the same are discussed in connection with FIG. 11 below.

Figure 5:
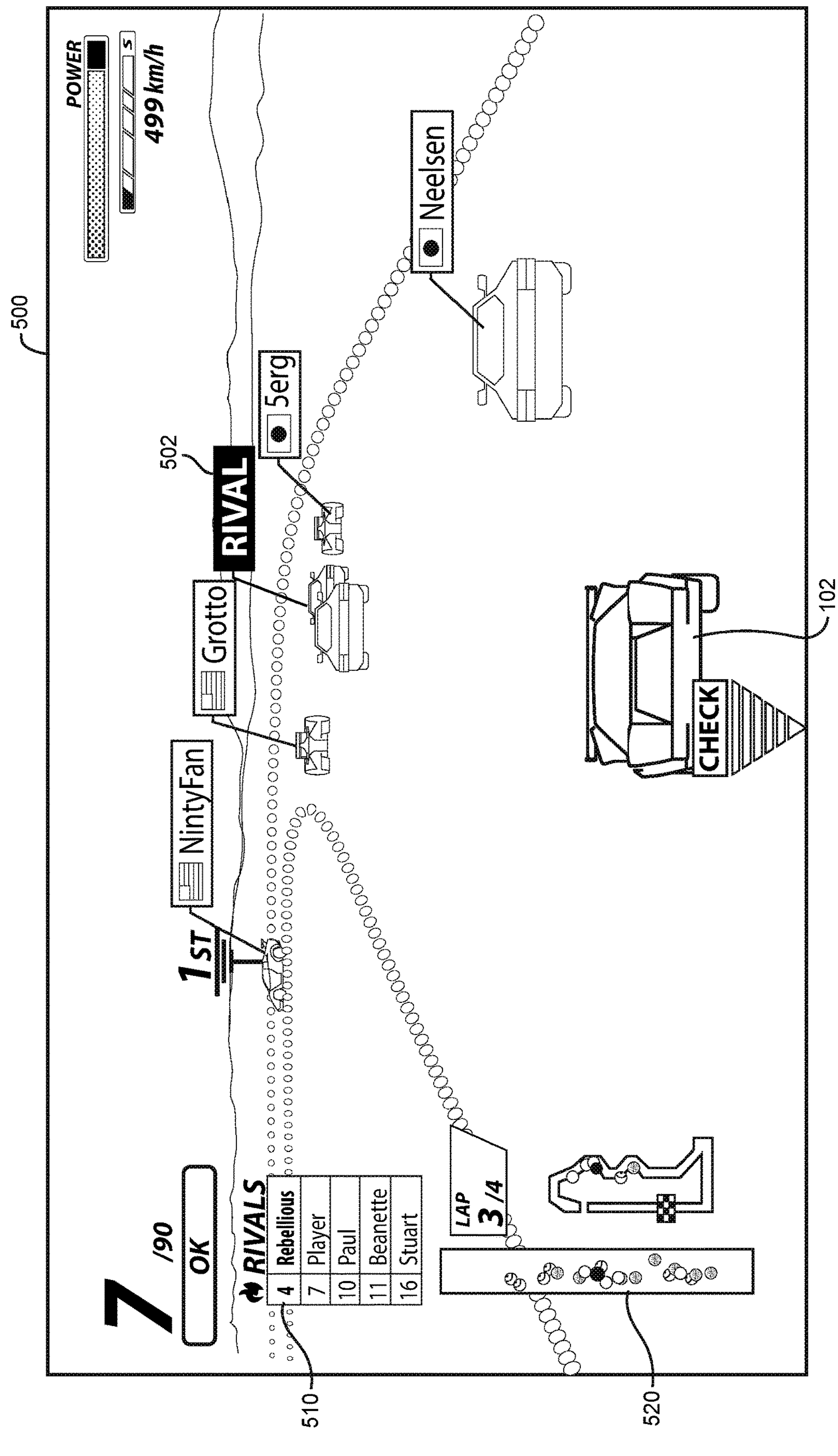
FIG. 5 is a wireframe view of the multiplayer video game of FIG. 1 that illustrates graphical elements for the dynamic assignment of other players as rivals according to certain example embodiments.

FIG. 5 is a wireframe view 500 of the multiplayer video game of FIG. 1 that illustrates graphical elements for how Rivals are shown to a player according to certain example embodiments.

Specifically, and as noted elsewhere herein, there may be tens or even a hundred or more different players, each with their own vehicle, within the same multiplayer game (e.g., racing around the same track). In certain examples, the number of players that may participate within the same multiplayer game may be 99. As used herein, the term "expanded multiplayer game" is used for situations in which at least 20 players are playing within the same multiplayer game. The term expanded multiplayer game is a subset of multiplayer games that involve at least two players. An expanded multiplayer game may have 25, 50, 99, 100, or more players participating in the same multiplayer game. In certain examples, each of the players participating in an expanded multiplayer game may have their own computing device.

With so many different players participating within the same game it may be difficult for some players to feel motivated in the game if they are not near the top of the leaderboard in the race. Accordingly, in certain example embodiments, one or more Rivals may be dynamically selected at the start of the race for each player. The selection of Rivals may allow a given player to compete against a smaller sub-set of players (called Rivals herein) during the larger race. In certain examples, 4 Rivals are selected for each player at the start of the race. Using this feature, players can enjoy the game even when they are not near to or competing for the top spot. Rather, they may focus on competing (e.g., racing) against the dynamically selected group of other players that are Rivals. The selection of the players as Rivals is discussed in more detail in connection with FIG. 7.

As shown in FIG. 5, a list 510 that includes the 4 Rivals of player (and the "Player") may be displayed. This may be shown to give the player their relative position with respect to the 4 rivals of the player. As shown in FIG. 5, "Rebellious" (ranked $4^{th}$ overall in the race) is the highest ranked player of the 4 Rivals of vehicle 102, followed by the Player (ranked $7^{th}$ overall), "Paul" (ranked $10^{th}$ overall, "Beanette" (ranked $11^{th}$ overall), and "Stuart" (ranked $16^{th}$ overall).

In some examples, Rivals of the player-controlled object 102 may be displayed differently to the player during the race. For example, as shown in FIG. 5, a "RIVAL" icon 502 is displayed above the vehicle that is controlled by Rebellious.

In some examples, a second, or alternative, mini map 520 may be displayed as part of the head-up display elements. Mini map 520 may display the positioning of objects in the race in a relatively linear fashion (e.g., not display the contours of a track). In other words, the positional relationship of all (or some) of the vehicles in the race may be shown (which may include NPCs), the form of the track may not be shown in mini map 520 (e.g., because it is linear and the track 104 is not).

In some examples, both mini map 520 and mini map 118 are displayed concurrently to a user. In other examples, one or the other (but not both) may be displayed. In some examples, a user can select how the mini maps may be displayed (e.g., by providing an input to select which mini map to show). For example, the user may select not to display either, to only display one (and be able to switch between which is displayed), and/or display both. As discussed herein, different graphical representations of the icons on the mini maps may be used to differentiate between the player, other player-controlled objects, non-player-controlled objects, Rivals, and other objects within the race.

Description Of FIG. 6: System

Turning now to the computer architecture provided to enable the multiplayer video game to be played by users, FIG. 6 is a system diagram that illustrates how the multiplayer video game shown in FIG. 1 may be implemented in a system using a client-server architecture according to certain example embodiments.

System 600 includes a server computer system 602 (also referred to as server 602 herein) that communicates with a plurality of computing devices 610 (610*a*-610*n*) that are each configured to execute an instance of game program 650. Game program 650 may be provided on a disc, cartridge, or may be downloaded to a corresponding computing device over a network (e.g., the Internet). In some examples, the game program is associated with an account for the user. This account may include a player name or the like, which is then displayed within the multiplayer video game.

There may be hundreds or even thousands of such computing devices 610 in communication with server 602 and there may be, for example, one hundred such computing devices participating within the same instance of the multiplayer video game. Each of the computing devices acts as a client that communicates with server computer system 602.

As discussed in connection with the various signal diagrams herein, computing devices 610 communicate with the server system 602 via a network 660. In some examples, network 660 may be, for example, the Internet where communication may be performed between the client(s) 610 and server system 602 using, for example, UDP/IP for transmitting state data of an executing game. In other examples, network 660 may be a local area network or a private network (including virtual private networks (VPNs)).

Each client (client 1, client 2, client 3, through client n) communicates with the server system 602 to send and receive data in connection with the multiplayer video game.

The data may include data for joining a game (e.g., as discussed in connection with FIG. 7), state data for when a game is executing (e.g., as discussed in connection with FIGS. 8 and 9), and player updates as discussed in connection FIG. 12. Other types of data that may be communicated may include voice data (e.g., VoIP), textual data for in-game messaging or the like, and other types of data that can be used in connection with the multiplayer video game discussed herein.

In certain examples, a client-server technical architecture may be used with the server 602 being dedicated to receiving and providing updates to clients (e.g., without having to rely on rendering images or the like). Such a technical architecture may be beneficial due to the number of clients (e.g., up to 100 for example) that can participate in a given race. With this type of architecture, clients can send and receive data packets to/from the server 602 without having to directly communicate with the other clients. While other types of network architectures may be employed in certain examples, it will be appreciated the other such architectures (e.g., peer-to-peer, or the like) may come with downsides in terms of performance and/or overhead. However, depending on application need, such other networking architectures may be used in certain example embodiments.

Client 610

Clients 610*a*-610*n* (generally referred to as client 610 herein) each operate on, or correspond to, a different computing device. Illustrative examples of a computing device on which a client may operate are discussed in connection with FIG. 13. Some computing devices may be personal computers, others may be mobile devices, others may be dedicated game devices. In some examples, a client can be hosted within a virtual machine or a virtual instance (e.g., a Docker container or the like). In such cases, a given computing device may host multiple clients that each operate separately. As shown in FIG. 6, each client 610 executes a different instance of game program 650 on a corresponding computing device. The game program 650 (e.g., an executable, such as an .exe for example) may be stored in memory device(s) 1314 (such as non-volatile storage) and loaded into RAM/other volatile storage for execution. The game program may be executed by one or more processors of the corresponding computing device in connection with performance of the functionality of the multiplayer video game described herein.

Each client 610 processes input provided by a user via, for example, input device(s) 1314 that are coupled to the corresponding computing device. In some examples, and as discussed in greater detail below, input may be processed by the corresponding client and then the results of that processing (e.g., updates to how an object has been controlled or changed) may then be communicated to server system 600. In other examples, the input may be communicated to the server 602, which may then perform processing based on that input.

In certain examples, each client that is part of system 600 corresponds to a different player within the multiplayer game. However, in some examples, a given client may process input (and other aspects) for multiple players. For example, a given client may allow two users to provide input via different input device(s) 1314 or the like that are both coupled to the same computing device. Such an implementation may be similar to split screen modes in other types of video games. The provided input is then used to update the vehicles associated with those respective players and then the updates to those vehicles may be communicated to the server system as discussed elsewhere herein.

In general, clients and computing devices are provided on a 1-to-1 basis such that each client is supported by a corresponding computing device. However, in some examples, multiple clients may execute on the same computing device. As an illustrative example, a computer may execute two instances of game program 650. For example, multiple clients may be provided via a cloud-based streaming service that processes input provided to a thin-client that is located with the user controlling a corresponding vehicle being processed by such a cloud-based stream service.

Server 602

Server system 602 may be composed of one or more of the computing devices 1300. The server system 602 may be responsible for allocating players to instances of the multiplayer video game, conducting/executing each instance, providing post-race functionality, and other aspects as needed. The server system 602 includes Lobby Module 604 and Race Module 606 to provide this, and other, functionality in connection with the multiplayer video game.

Lobby Module 604 is responsible for handling connection requests from clients, generating lobbies (e.g., determining which clients are to participate within a given instance of a race), and matching or otherwise placing clients and their players into instances of the multiplayer video game. The creation of new instances of the multiplayer video game is discussed in further detail in connection with FIG. 7.

Each new instance of a race of the multiplayer video game may be handled via Race Module 606. The Race Module 606 is responsible for executing races and handling communication to/from clients 610 that are participating within a given race. For example, the Race Module 606 may be responsible for receiving updates to the positions of vehicles from each client and then, for example, determining a winner (e.g., which vehicle crosses the finish line first, etc.). In some examples, the Race Module 606 may include functionality for controlling NPC vehicles. In some examples, the Race Module 606 may execute processing that includes starting a new virtual container instance (e.g., a docker container, virtual machine, or the like) to host the executing each instance of the Race Module 606. This allows, for example, multiple different races to occur simultaneously and thus allows thousands or more users to participate across many different races that may be operating concurrently (but separately from one another) on the server 602.

The server system 602 also includes or communicates with a player database (Player DB) 608. The player database 608 stores a skill rating for each player and other game result data for players that participate in the multiplayer game. In some examples, information in the player database 608 is used to generate Rivals for a given player. The skill rating that is stored may be, for example, calculated using the Elo, Glicko, or Glicko 2 rating system and adjusted based on the results of each race (at 1212). This is discussed in connection with FIGS. 7 and 12. Additional details regarding the processing performed by the server are provided in connection with FIG. 10.

Figure 7:
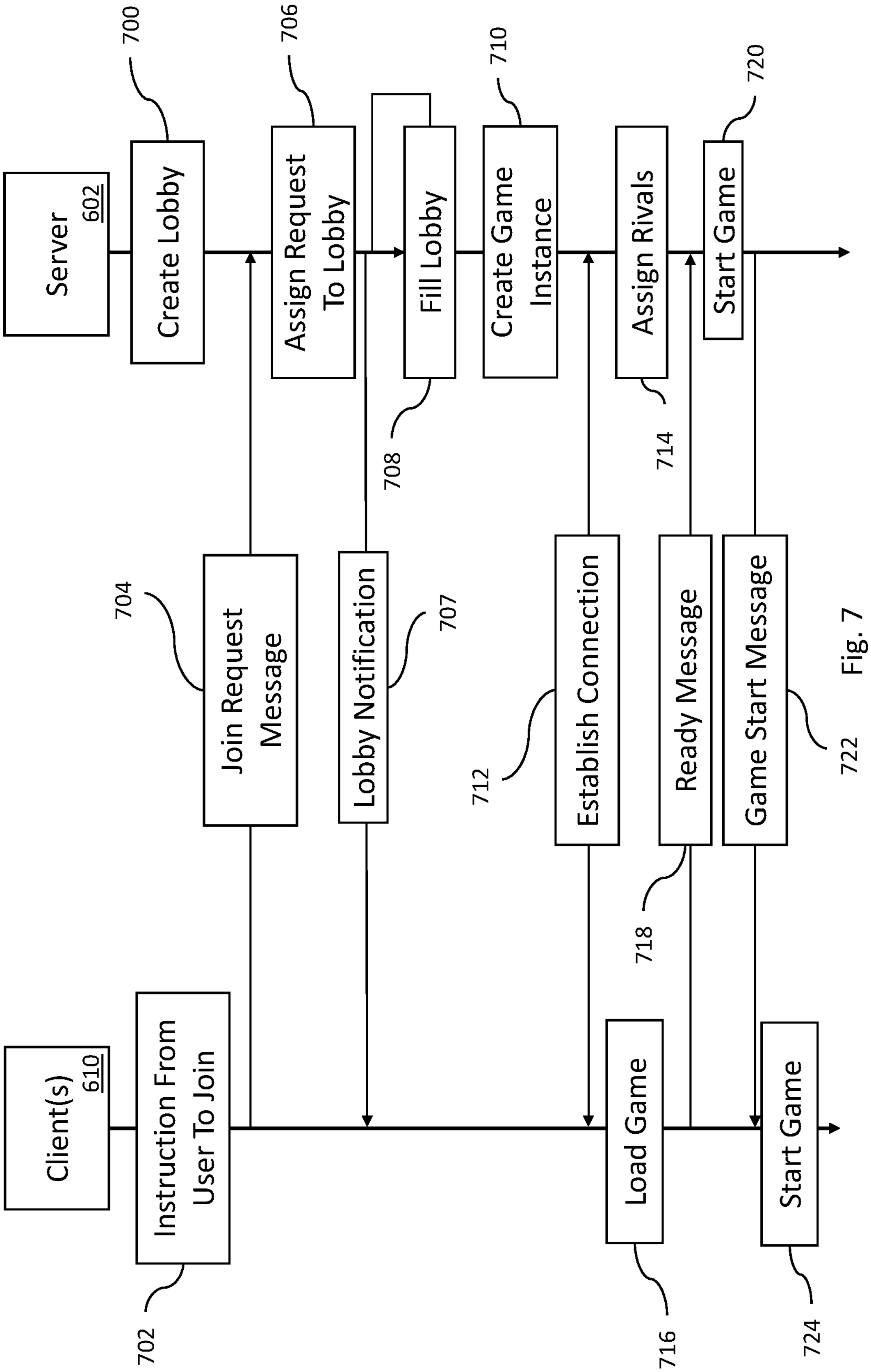
FIG. 7 is a signal diagram that illustrates setup of an example instance of the multiplayer video game shown in FIG. 1 and how communication can occur between a client and server in connection with such setup according to certain example embodiments.

Description Of FIG. 7: Setup Processing

FIG. 7 is a signal diagram that illustrates setup of an example instance of the multiplayer video game shown in FIG. 1 and how communication occurs between client(s) 610 and server 602 in connection with such setup according to certain example embodiments.

At 700, the server 602 generates a lobby that allows the server 602 to accept connection or join requests from clients 610. This may include, for example, generating a specific lobby identifier (e.g., a GUID) or the like. In some examples, each instance of a lobby may maintain or store a data structure of players that have been added to that lobby. For example, a list of playerID's may be associated with each generated lobby identifier. In some examples, IP addresses or other connection information may also be stored in connection with each player that is placed in a lobby. In some examples, different lobbies may be created for different geographical locations. For example, one lobby for users connecting from North America and another lobby for users connecting from Europe. In certain examples, there may be different lobbies generated for different game types. For example, one lobby for grand prix and another for single races.

At 702, a client processes an instruction from a user to join or search for an instance of the multiplayer game that they can join. The processing at 702 may be performed after starting the game program or may be performed by a dedicated game search process or the like.

At 704, the client communicates a data message to the server 602 that includes a join request message. The join request message may include information regarding the client, player, or computing device associated with the join request. For example, the playerID or the like may be included in the join request message.

Once the join request message from 704 is received by the server 602, the server then processes the message and assigns the request (or the player or the like associated therewith) to a lobby at 706. In some examples, if no lobby is available, then a new lobby may be created (e.g., via 700). In some examples, the requests that are received may be separated based on, for example, geographical location or the like. As noted above, there may be different geographically specific lobbies. In such a case, the request may be assigned to a relevant geographic location. In other examples, all requests or lobbies are handled regardless of geographic location.

Once a player is assigned to a lobby, a notification message is communicated back to the client 610 with the information on the lobby. This may include the total number of players in the lobby and an expected wait time or the like The process of assigning received requests continues at 708 as new requests are assigned to a corresponding lobby as the new requests are received. Note that during this time, those clients that have been assigned to a lobby may be waiting for the start of the game and may receive updates on the state of the lobby from the server 602. During this process animations or videos may be displayed to the user. In some examples, the process of filing up a lobby may also provide users with an option to warm up (e.g., to practice controlling their vehicle or selecting a vehicle to play).

Once the lobby is determined to be filled at 708 (e.g., the number of players has reached a given threshold—e.g., 100 or the like; or the lobby has been pending for more than a threshold length of time—e.g., 1 minute or 5 minutes, etc.), then the server generates a new game instance at 710. The generation of a new game instance may include tasking a virtual machine or the like to start a new multiplayer game. In some examples, this may include sending a command to a computing node of the server 602 to start a new game instance. This command may include a list of the players (and their connection data) that are to participate in the new game instance.

In example embodiments, the lobby process may include additional processing of adding server-controlled vehicles (e.g., artificial intelligence (AI) or NPC vehicles) to a lobby. This may be accomplished to assist in filling a lobby more quickly.

In some examples, there may be multiple different types of AI vehicles that can be added. These different types may correspond to different difficulties and the like. For example, a first type of AI vehicle may perform extremely well within races (e.g., preforming the race at a high efficiency and without many or any mistakes), while another type may be designed to not perform as well within races. In some examples, the AI vehicles added to a lobby may be distributed among different difficultly levels (e.g., 3, 4, or 5 different difficulties). In some examples, the more spaces within a lobby are filled with AI vehicles, the average difficult level of the AI will increase (e.g., an increasing percentage of AI vehicles may be the most difficult).

In some examples, when an AI vehicle is added to a lobby it is then assigned a skill parameter. The value for the skill parameter may be based on the difficulty of the AI (e.g., 1 to 5) and then a randomized value that is within a range that is tied to that selected difficulty.

At 712 the server communicates with the clients to establish (or establishes) a connection from the computing node or other processing resource of the server that is handling the game processing to the client. This may include communicating, for example, an IP address of the node that is hosting the server and any other connection or game initialization properties to each of the clients. It will be appreciated that the communication that occurs at 712 may include multiple data messages that are communicated from the client(s) 610 to the server 602 and/or from the server 602 to the client(s) 610.

When the connection information is provided at 712 to the clients, then clients 610 start or load into an instance of the multiplayer game at 716 (e.g., based on execution of instructions that are part of game program 650). For example, the graphical assets for the race may be loaded (e.g., textures for a racetrack, the vehicles in the race, etc.). In some examples, this may include starting a new computer process or thread that is separate from the lobby or join process. In some examples, clients 610 may continue to communicate with the server 602 as the loading of the game occurs. For example, information of other players may be communicated as the game is loaded.

An example of other information that may be communicated during the loading may be the communication of selected Rivals. At 714, the Rivals for each player in the game are selected or otherwise generated. This aspect is discussed in greater detail in connection with FIG. 12. In some examples the selection of Rivals may occur as part of the Lobby stage (e.g., at 708 once the lobby is filled) and in other examples, the selection of Rivals may occur when the game instance is created (e.g., at 710).

Once the game process is loaded on a given client, then at 718, the client communicates to the server a ready message. The ready messages from the various clients that are part of the game may be collected by the server 602. In some examples, a timeout may be used so that if a ready message is not received from a client by, for example, 15 seconds (or other threshold amount) after communication to the client at 712 (or other time when the timer for the threshold may start), then the corresponding client is automatically removed from the race. In such a case, a disconnection message or the like may be communicated to that client from the server.

At 720, the server 602 determines that the game should be started. At 722, the server 602 communicates to each client 610 in the game a game start message.

At 724, each client 610 receives a game start message and then starts the game (e.g., by executing instructions of the game program 650). In some examples, the "start" message may trigger the starting of a countdown (e.g., 3-2-1 or the like) that is displayed to the user on a display coupled to their computing device. Thereafter, each user may control their vehicle in the race. Further details of the race processing are discussed in, for example, FIGS. 8-10, and elsewhere herein.

Figure 8:
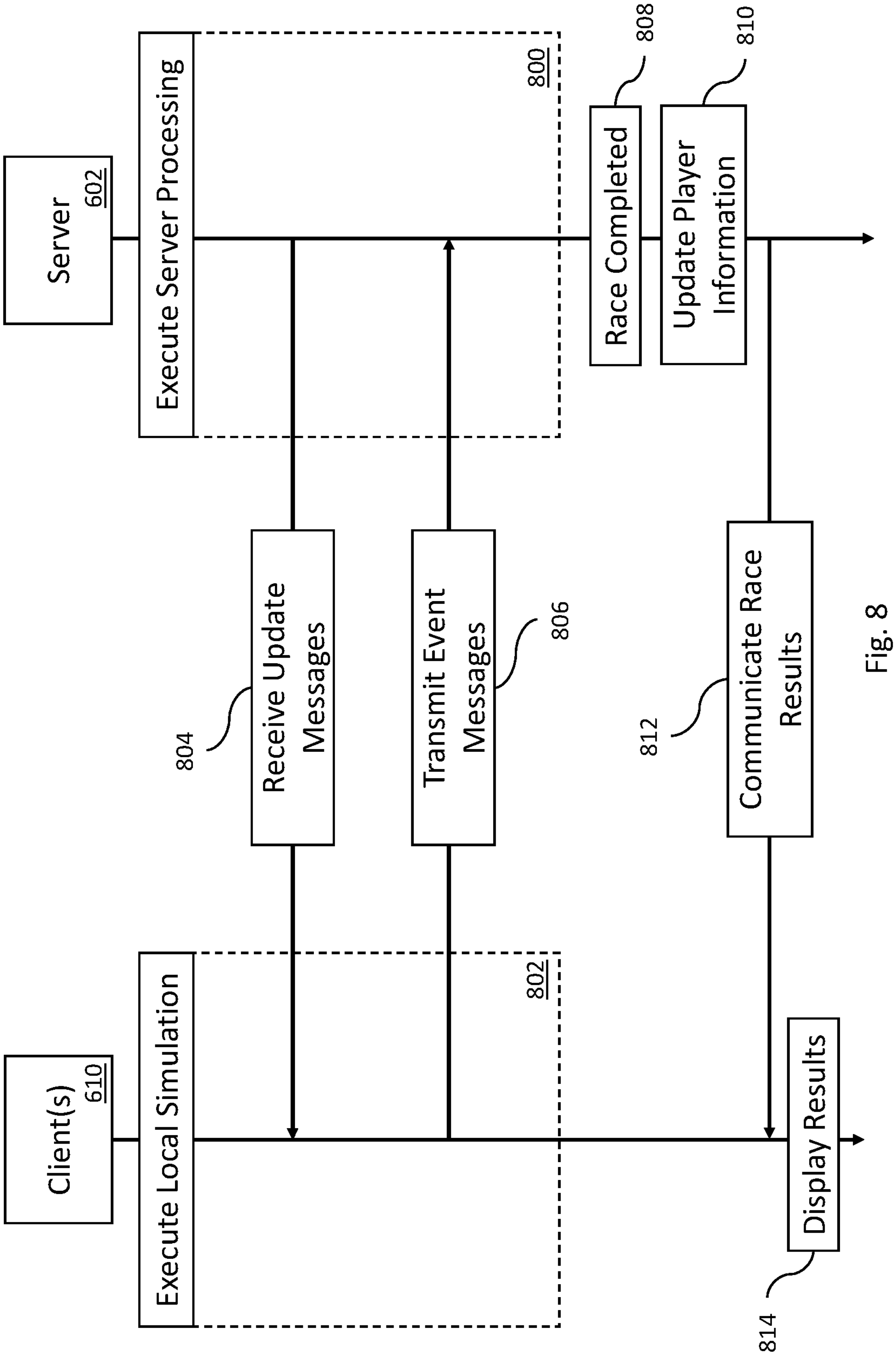
FIG. 8 is a signal diagram that illustrates communication between a client and server during execution of an instance of the multiplayer video game shown in FIG. 1 according to certain example embodiments.

Description Of FIG. 8: Game Processing

FIG. 8 is a signal diagram that illustrates communication between clients 610 and server 602 during execution of the multiplayer video game shown in FIG. 1 according to certain example embodiments.

When the multiplayer video game is started, each client 610 executes a copy of a game program 650. The server 602 also executes its own version of the multiplayer game. Each of the executing instances is a simulation of the multiplayer video game. During the game messages are communicated from each client to the server and from the server to each client. These messages are used to update the respective game instances regarding changes in, for example, how a vehicle is being controlled by a user or how other vehicles have been controlled by other users. As an illustrative example, a given client 610 may communicate information regarding the speed and position of the vehicle being controlled by the user to the server 602. The server receives such messages from all clients and then communicates, to each client, updates regarding all of the other players (and their respective vehicles) within the game. The various clients receive those messages and then update their simulation based on the data in those messages (in addition to any input provided by the user of the computing device). However, some processing (or the results of such processing) performed on clients (or the server) may not be communicated. As example of this is the creation of energy objects or acquisition of such objects.

Turning now more specifically to FIG. 8, the server 602 executes a location simulation of the multiplayer game at 800 and each client 610 also executes a local simulation of the multiplayer game at 802. This may involve each respective computing device (the server and the client(s)) executing a game application that performs the operations in connection with running the simulation for the multiplayer video game. Further details of the processing performed in the simulation on a server are discussed in FIG. 10 and further details of the simulation performed on a client are discussed in FIG. 9.

In some examples, the execution of the server processing is based on messages received from the clients and any local processing performed on the server for controlling non-player objects (including determination of how to control AI players).

In some examples, execution of the local simulations on each client may be based on messages received from the server, input provided by users (e.g., via one input device(s) 1314), and any local processing performed on the server for controlling non-player objects (NPCs) within the race.

Messages communicated from the server 602 to the client(s) 610 (at 804) and/or to the server 602 from client(s) 610 (at 806) may involve periodic updates (e.g., that occur once every $X^{th}$ frame that the simulation has been updated, or other period) and/or updates that are triggered by an event or other triggering action. Accordingly, different actions or triggers (time, actions within the race, input from users, etc.) may be used to cause messages to be communicated between the server 602 and clients 610. In some examples, messages are communicated from clients to the server every frame (e.g., each frame a client sends and update). In some examples, the server communicates updates to clients on a less frequent basis—e.g., once every other frame, once every $6^{th}$ frame, or the like. In some examples, significant event updates may be communicated from the server to clients when they are determined. An example of this may be when a vehicle activates a special ability or transports to the second track. Such updates may be sent in between the periodic updates communicated from the server.

Different types of data may be included in the messages communicated between the clients and server. As non-limiting examples: a value for a parameter may be transmitted, movement and/or position data (e.g., for a vehicle) may be transmitted, data regarding commands input by the user (e.g., the buttons are being or have been pressed), a status of the race (e.g., the ranking of players within the race) and other types of data, such as significant events that have occurred (e.g., when a vehicle transfers between tracks in the game). In some instances, the data is periodically transmitted (e.g., every $X^{th}$ frame, such as every other frame, every $10^{th}$ frame, or every $6^{th}$ frame, or at other rates such as every 1 ms, every 5 ms, 10 ms, or every 30 ms). In some instances, data messages are transmitted on an on-demand basis. For example, when a significant event occurs for vehicle 102 (e.g., the activation of a special power or the like), a data message regarding such a triggering may be transmitted. As another example, when vehicle 102 collides with another object within the multiplayer game (e.g., another player-controlled object or a non-player-controlled object), a data message regarding that collision may be transmitted to the server computer system for processing.

Returning to FIG. 8 more specifically, processing of the respective local and server simulations continues until the race is completed at 808. When the race is completed, then the server may update the player information of each player that participated in the race (e.g., as discussed in FIG. 12). For example, the experience or rating of the player may be updated based on their performance in the race. This updated data may be stored in the player database 608.

At 812, the results of the race are communicated to each of the clients 610. These results may then be displayed to the users on their respective computing devices at 814. The results may include the player who finished first in the race, the relative placement of the Rivals for the current user of that client, and any updates to the player's ranking (e.g., based on their placement relative to their Rivals). Also included may be data for the new or updated ranking for the user.

Figure 9:
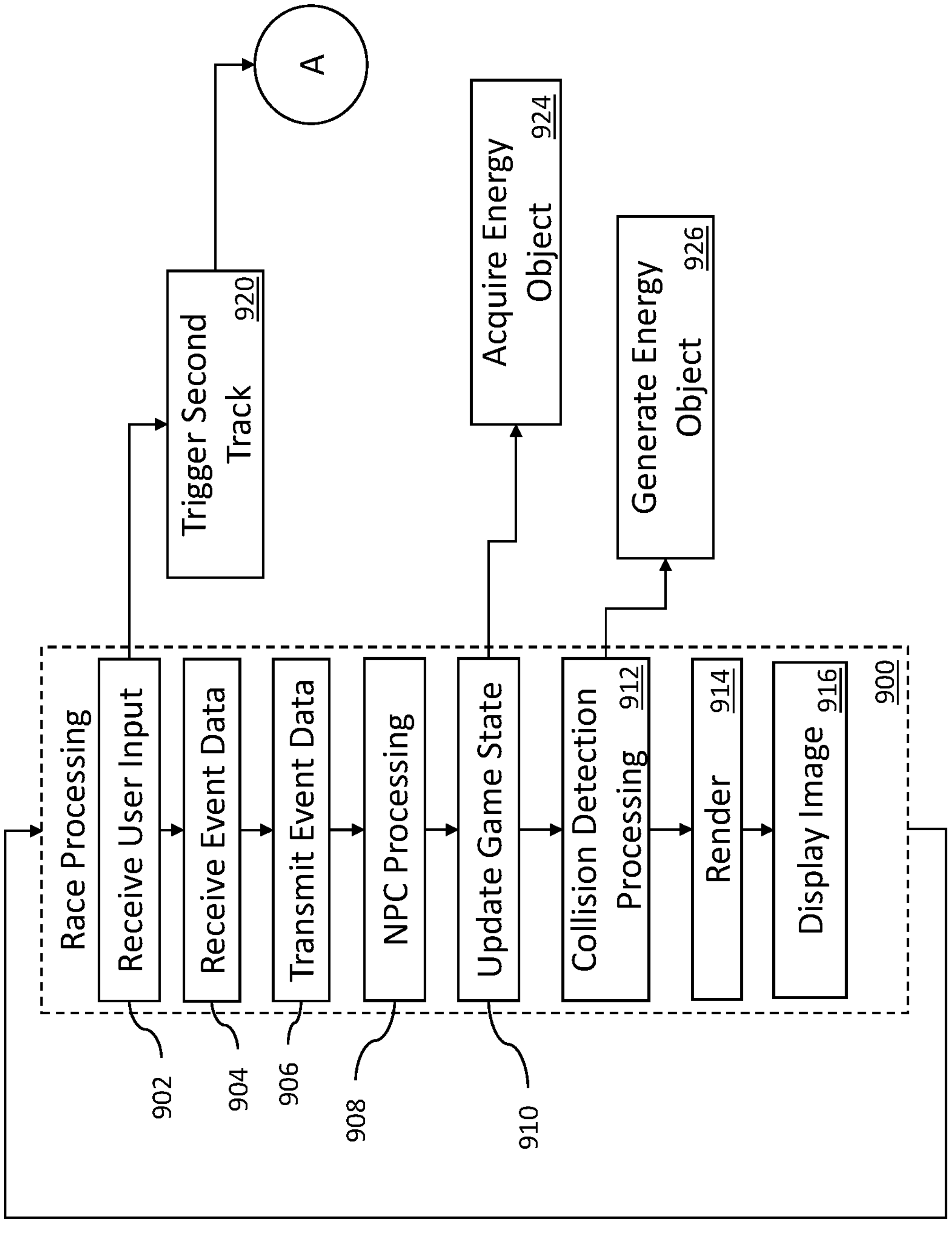
FIG. 9 is a flow chart of a process that may be executed on a client computer system for the multiplayer video game shown in FIG. 1 according to certain example embodiments.

Description Of FIG. 9: Client Processing

FIG. 9 is a flow chart of a process that may be executed on computing device that is a client (such as shown at 802 in FIG. 8) in the multiplayer video game shown in FIG. 1 according to certain example embodiments.

Each client or each computing device that is being used by a user to participate in the multiplayer video may operate the process shown in FIG. 9. The process shown in FIG. 9 may be performed based on execution of computer instructions that are part of the game program 650 being executed by a corresponding computing device. And, as discussed in greater detail below, the processing shown in FIG. 9 can occur (and does occur in certain example embodiments) multiple times per second as data is received, processed, and then output. In some examples, the rate at which the looped process shown in FIG. 9 occurs is 24, 30, or 60 times per second. Other rates, whether fixed or variable, may also be implemented in certain example embodiments.

Once a race has started, then race processing 900 is performed.

At 902 user provided input is received and processed. This may include determining what buttons or other actions have been triggered by the user on an input device that is coupled to the computing device being used by the user. For example, if there are 5 different buttons on an input device, the computing device may store the status of each of these buttons (or just which ones are pressed). As an illustrative example, each button may be represented by a state variable (e.g., a state of the corresponding input) that is used to track if a button is pressed, how much is it pressed, or the like.

Different types of input may be processed according to certain example embodiments. For example, the input may be voice commands and accordingly the processing at 902 may include determining what voice command has been provided. In certain examples, historical data that a user has input is stored into a data structure or input buffer. In other examples, the input that is provided need not be stored past its use in the current frame of execution.

One type of input that may be provided at 902 is a trigger for the special ability that is associated with the special ability meter 114. If the input associated with the special ability is provided, then the process may determine if the value tracked in connection with the special ability meter 114 meets or exceeds a given threshold at 920. If so, then the special ability is activated (note that there may be additional conditions for activation in certain example embodiments). Additionally details of the special ability processing in connection with transitioning to a second track within the race are described in more detail in FIG. 11.

In certain example embodiment, triggering the second track at 920 may occur automatically once the special ability is full or has reached a threshold. In certain example embodiments, automatic triggering of the special ability may be based on other conditions within the game. For example, if the player is to crash out (e.g., health reduced to zero) and the special ability meter is full, then the game may automatically trigger the special ability to warp the vehicle to the second track. Other types of triggering conditions (e.g., speed, place in the race, etc.) may be used to control our automatically trigger the special ability in certain example embodiments.

At 904, one or more data messages (e.g., packets) may be received from the server system 602. Data transmitted from the server system 602 may include data regarding parameters or attributes of vehicles other than that controlled by the user of the current client (e.g., other than vehicle 102). Such attributes may include the health of the other vehicles (e.g., as represented via bar 112), movement data of the other vehicles (such as velocity as represented by the km/h shown in FIG. 1), whether a collision between the vehicle 102 and another vehicle has occurred, direction data of the other vehicles, and the like.

In some examples, collision events are only transmitted if the collision between vehicle 102 and the other vehicle would cause the health of either vehicle to drop to 0 (or just the health of the vehicle 102 of the current user). In some examples, when a vehicle causes a collision that reduces the health of another to 0 (to knock them out of the race), then the health of the remaining vehicle may be increased.

At 906, data (e.g., packets) may be sent to the server 602 for processing. The data communicated from a given client to the server may be the same or similar to that received by the server 602. However, in certain examples, the data communicated to the server 602 may only relate to the attributes or properties of the vehicle 102. In other words, data regarding the state of the other player vehicles for a given local simulation may not be transmitted from the client of vehicle 102. Rather, data for such vehicles may only be received from the server 602. Indeed, in certain examples, messages that are communicated to the server from a given client may only relate to properties of the vehicle 102 for that client.

In some examples, the state data of the input device that is used by the user may be sent. This state data may include the current state of the controller/user input device (e.g., what buttons or the like that are being pressed or used). In some examples, the data may be communicated to the server after the game state is updated for each frame (after 910). In other words, the inputs provided by the user using the user input device may be applied to update or modify any parameters of the vehicle 102 being controlled by the user and the result of that processing may be communicated to the server 602.

In some examples, when vehicle 102 is involved in a collision and that vehicle is the "attacker", then an attacker priority flag may be included in the message communicated to the server. This may be used by the server 602 to resolve collisions in favor of the "attacker."

At 908, processing for controlling any non-player-controlled objects of the video game may be performed. As an illustrative example, a non-player vehicle may be present on the track and may be designed to drop energy objects periodically. The processing at 906 may control the speed, direction (or existence of) such non-player vehicle. Further, and as discussed elsewhere herein, the generation of energy objects by such non-player vehicles may also be triggered. In some examples, data received from the server 602 may be used to control the non-player vehicle at 906. As one illustrative example, the non-player object that is used to drop energy objects may be triggered by an instruction from the server 602. However, the movements of that vehicle may be controlled via the local simulation (e.g., instructions on how to move the non-player vehicle may not be provided by the server 602).

In certain example embodiments, the processing for NPCs may vary between the various clients that are participating in the same multiplayer game. As an example, the "same" NPC may be present within each locally executing simulation of the multiplayer game that is being executed on each client. The existence of such an NPC in the game may be controlled based on, for example, an instruction to display/spawn that NPC that is received from the server 602. Accordingly, in certain examples, the position of the NPC may be the same across various clients. However, in other examples, the location of the NPC on each client may be independently handled. The NPC may be designed to drop energy objects on the racetrack. However, the rate at which energy objects are dropped (or how many are dropped) may vary for each client. In certain example embodiments, the distribution of energy objects from such NPCs for each client may be a function of (e.g., based on), the placement of where the vehicle 102 for that client is within the race. Thus, for example, if a player-controlled object is in first place, then the rate at which energy objects are dropped by that NPC in the local simulation for the client of that player-controlled object may be 1 per 5 seconds. In contrast, the same NPC that is being simulated on another client for another player-controlled object that is in $50^{th}$ place may have a drop rate for energy objects of 1 per second. Accordingly, the drop rate of energy objects by NPCs within the local simulation that is being performed (e.g., at 802) may be controlled based on where the corresponding player-controlled-object is placed within the race for the multi-player game. In certain examples, the higher the current placement for a vehicle, the lower the drop rate within the local simulation of that vehicle.

Other types of varied NPC control may also be provided in certain examples. For example, an NPC may be generated within each local simulation and be designed to interfere with the control of the player-controlled object (e.g., by attempting to collide with the player-controlled object or the like). The aggressiveness with which this NPC seeks to accomplish this task may be a function of the current rank of the player-controlled object. Other aspects that may be controlled entirely (or mostly) within the local simulation are discussed below in connection with 924, 926, and elsewhere herein.

In some examples, other vehicles that are participating in the race may be NPC controlled. How these vehicles are controlled may be provided/determined by the server. In other words, instead of receiving position/state updates from clients and then the server communicating those updates to clients, the server itself will generate position/state data for those NPC participating vehicle and then communicate such data to the clients.

Returning more specifically to FIG. 9, once the data regarding input from the player is processed (at 902), and any current updates are received/processed from the server (at 904), and the processing for updating any NPC objects is performed (at 908), then the game state of the local simulation is updated at 910. The updating of the game state may include updating the positions of the player's vehicle 102 and other objects within the virtual game space based on the newly received input/messages (from 902/904/908).

In some examples, the updating of the positions of the objects may include calculating the position at which those objects are to be located by performing an interpolation based on the data that has been received. Specifically, new data regarding the other player vehicles (or other aspects of the game) may not be received from the server for every frame of execution (e.g., because the server may only send updates every $3^{rd}$ or $6^{th}$ frame or the like). Thus, interpolation may be used to guess where other player vehicles will be located for this frame and what actions they may take. Such interpolation may also be beneficial due to the latency of communicating the actions of one vehicle from a first computing device, via the server, to another computing device. The delay may be 100 ms or more between the two computing devices. Accordingly, in certain examples, the data received from the server may be processed using an interpolation algorithm or the like in order to provide a better "guess" as to where the vehicles of the other objects are located within the virtual game space.

In any event, the local game state of the locally executing instance of the game program 650 is updated in order to, for example, update the positions of the vehicles and other objects within the virtual game space.

With the positions of the objects within the virtual game space updated, then at 912, collision detection processing may be performed. This may involve determining when two (or more) vehicles (or other objects) have collided with each other within the game world. Such processing may include determining if some (or all) of two or more vehicles occupy the same location within the virtual game space.

An illustrative example of a collision occurring is shown in FIG. 2 when vehicles 106 and 108 collide with one another. This collision may be determined due to updates received from the server 602 (or based on interpolation). Once the movement related data for vehicles 106 and 108 is received from the server (e.g., at the computing device being operated by the user controlling vehicle 102)—or interpolation has been performed, the game state the local simulation of the video game may be updated from what is shown in FIG. 1 to what is shown in FIG. 2 (additional frames may have been displayed in the interim) in a manner that causes the collision between the two vehicles. Once a collision is detected, then the additional processing may be triggered.

In some examples, the collision detection processing may also include determining and handling collisions that occur with other objects or elements within the race. For example, when a vehicle collides with a barrier or the like.

When collisions are detected between two other player vehicles, the local simulation may handle such collisions internally. However, if a collision involves the player-controlled object 102, then the tracked health (as shown in 112 of FIG. 1) may be decreased due to the collision. Additionally, the health of the vehicle 102 may be communicated to the server for handling. In contrast, the health of the other player vehicles may not be communicated to the server from another client. More specifically, in some examples, collisions that occur between other player vehicles may not affect the tracked health of those vehicles within that simulation. Rather, the health values may be updated and controlled based on messages received from server 602. In other words, health updates for vehicle 102 may be controlled based on the corresponding "local" simulation for that vehicle, while the health of other vehicles (e.g., 106/108) may be based on the health parameter for a vehicle received at 904 from the server.

In some examples, the transmission of data to the server regarding the attributes of vehicle 102 (e.g., 906) may occur after the updating of the game state or after the collision detection processing.

In some examples, the transmission of data to the server system 602 may not occur every frame, but may instead occur, for example, every other frame or every $5^{th}$ or $6^{th}$ frame, or other interval.

Once the game state of the game space has been updated for the current frame (which may include performance of collision detection at 912), then a view of the game space is rendered at 914. As shown in FIG. 1-5, the view that is generated may be a "third" person perspective that includes the vehicle 102 being controlled by the user. It will be appreciated that other types of view (e.g., first person or the like) may be generated in certain example embodiments. In some examples, the rendering may include generating the heads-up display elements and overlaying those on the rendering image.

Once the image is generated, then it is output to a display device that is coupled to the computing device at 916 for viewing by the user that is playing the multiplayer video game.

Steps 902 through 916 may be referred to as race processing 900. These steps may be used to process new data, update the game state of the race of the locally executing simulation, and present a result to a user (e.g., in the form of an image, audio, or the like). In some examples, each of the elements shown in FIG. 9 may be performed as part of the race processing.

In certain examples, the processing shown in FIG. 9 operates multiple times per second in order to output images at a sufficient frame rate. Illustrative frame rates may be 24, 30, 60 or more frames (e.g., images) per second. It will be appreciated that not every element shown as part of race processing may be performed for each iteration. For example, new data from the server 602 may not (and likely will not) be received every frame of execution. This may be due to latency or the rate at which the server 602 communicates updates to the clients. Similarly, data may not be transmitted to the server 602 for every iteration. If there are no NPCs present in the race, then there may be no NPC processing.

Generation Of Energy Objects 926

In certain example embodiments, energy objects may be generated and placed or located onto the racetrack during the course of a race. The generation of energy objects is another example of additional processing that can be performed based on or in response to detection of a collision. More specifically, when a collision is detected between two (or more) vehicles (including vehicle 102), an energy object may be created and located on the track of the current race. This is illustrated in FIG. 3 where energy object 300 is generated based on detection of the collision between 106 and 108.

It will be appreciated that while 106 and 108 may be determined to collide on some clients, not all clients may determine such a collision. This may be because of latency or other factors which may cause the positions of 106 and 108 to vary slightly between the different simulations across the various clients of the multiplayer game. Thus, the differences in detected collisions may be another factor that varies the generation of energy objects between different clients.

In some examples, energy objects may have a timer attached to them that causes the energy object to expire (e.g., be deleted from the race) if it has not been picked up by the expiration time. For example, a timer may be set for each energy object that is 6 seconds, 30 seconds, or 1 minute, or other time value.

In some examples, each local simulation may cap the number of energy objects that may be located on the track at any one point in time. In certain examples, a queue (or other data structure, such as a circular or ring buffer) that is stored in memory devices 1304) may be used to store the details of active energy objects within the race. Accordingly, when a new energy object is created, it is added to the data structure. The data structure is full, then the oldest energy object is removed (or overwritten) from the data structure and then correspondingly deleted from the racetrack (e.g., even though the timer for the energy object may not have expired). In certain example embodiments, each local simulation may cap the number of energy objects that may be located within a radius (or other distance) of the vehicle 102. This may be in used instead of a global cap as discussed above.

In certain examples, while energy objects are placed onto the track and part of the multiplayer game, their existence is not communicated to the server. For example, if vehicles 106 and 108 collide on one client that collision is not communicated to the server (which then does not communicate that collision to all other clients). Similarly, the generation of the energy object created from that collision is also not communicated to the server (which then also does not communicate the existence of the energy object at that location to other clients). Instead, each client may be independently responsible for: 1) determining collisions between vehicles; and 2) the generation of energy objects from such collisions. An exception for the determination of a collision is when a collision between vehicle 102 and another vehicle will drop the health of one of the vehicle to zero or below. In this case, the server may act as an arbitrator to determine whether the collision occurred or not.

In certain example embodiments, the energy objects are stationary when placed onto the track and do not move. In certain example embodiments, some (or all) of the energy objects may move (e.g., similar to how a ball may roll).

In certain example embodiments (and as discussed above), energy objects may be generated via other techniques. As noted above, NPCs may periodically spawn energy objects. Accordingly, in certain examples, energy objects may be generated without first determining that a collision has occurred. In certain example embodiments, energy objects may be generated at the location a vehicle warps to/from or moves to/from the second track. In other words, when a vehicle moves from the first track to the second track, an energy object may be placed at that location.

In some examples, when a vehicle crashes out (e.g., the health of the vehicle is 0), then an energy object is placed at (or based on) the location of the crash in the game. In some examples, collisions with NPC controlled objects may generate energy objects. As an example, the NPC object that periodically drops energy objects may also drop such objects based on determination of a collision between a vehicle and the NPC object.

As discussed below, in certain examples, processing for generation of energy objects may also occur in the simulation that is executed by the server. In some examples, the same conditions may be used for generation of energy objects on the server versus that of the clients. In other examples, different conditions may be used for determining how/when energy objects are to be generated.

Acquisition Of Energy Objects 924

When energy objects 150 are created and placed onto the track within the multiplayer video game, vehicles may also pick up those energy objects and use them to charge up or increase the special ability meter 114. As with the generation of energy objects, the acquisition of energy objects may be an entirely client simulation process that is not controlled by or managed by the server. In other words, each client may be responsible for determining which objects within its simulation acquire the energy objects created for that simulation.

Determination of when a vehicle can/has picked up an energy object may occur at 924 and as part of or in connection with the updating of the game state at 910.

In certain example embodiments, each vehicle within the race is assigned a collection threshold parameter that corresponds to how far away from the vehicle (or a centroid thereof) that an energy object within the virtual game space may be acquired or otherwise picked up by that vehicle. In certain examples, this value may be expressed as a radius from the centroid of the vehicle or may be provided as a bounding box or the like. If an energy object is within this threshold, then the processing at 924 collects the energy object and adds a value to the special ability meter.

In certain examples, the value may be fixed, be dynamic, or a combination of both. In certain examples, the value that is given to an energy object when it is obtained by a vehicle may vary based on one or more factors. The following is an illustrative example of such variance. By default, energy objects may have a value of 10. But the value may be modified based on a decay rate that is based on how recently an energy object for that vehicle has been picked up. Thus, for example, a new energy object may be worth only 75% of the value of the prior energy object. In some examples, decreases in the value of a picked-up energy object may occur if multiple energy objects are picked up by vehicle 102 in quick succession.

In certain example embodiments, the value of an energy object may be based on the amount of health that was lost by the vehicles involved in the collision that created that energy object. In other words, the harder or more violent of a collision (and the larger drop in health from the corresponding vehicles), the larger the value of the energy objected created from that collision.

In some examples, energy objects that are created by collisions may have a default value (or value) that is different than those dropped by NPC vehicles. For example, NPC created energy objects may have a default value of 5 in comparison to a default value of 10 for those created based on 926.

In some examples, the value of an energy object may be modified based on the current placement of vehicle 102 within a race. For example, a first placed vehicle may only get 50% of the default value, a $50^{th}$ placed vehicle 100%, and a $90^{th}$ placed vehicle 150%.

As part of each client simulation during the updating of the game state, it is determined if any of the vehicles are within an acquisition range to acquire an energy object. This determination may be made for all player vehicles in the race. However, for those other player vehicles in a given executing location simulation, the acquisition of an energy object will just remove that object from the course and not modify the special ability meter for that vehicle. Rather, the special ability meter is only increase if the local vehicle (vehicle 102) acquires an energy object. With this approach, energy objects are removed from the local simulation as updates are provided to control the other player vehicles on the track.

It will be appreciated that by using the techniques described herein, that the individual simulations (e.g., each instance of the process shown in FIG. 9) being performed across the various clients may be different even though each client is part of the "same" multiplayer game. Thus, in certain examples, a goal of certain techniques herein may be to not completely synchronize every aspect of the multiplayer game across the tens or even hundreds of different simulations that are being executed across the various clients that are participating in the same game. As an example, an NPC may cause 100 energy objects to be generated in one simulation for one client, but only cause 10 energy objects to be generated for another simulation on another client (e.g., because the player-controlled object in the first is higher placed). Similarly, the dispersal of energy objects in the different simulations may be different due to the other player vehicles "acquiring" energy objects during the simulation (e.g., and not being available when vehicle approaches the location of a collision). The acquisition of such objects may thus be different (perhaps markedly so) across the different simulations that are being executed as part of the multiplayer game.

This type of approach advantageously provides for not transmitting data regarding certain events (such as the generation/acquisition of energy objects or the like) over a network. Instead, the handling of such events may be self-contained within each location simulation without having to transmit data regarding such events among the various clients. Moreover, this approach also advantageously allows for varied gameplay to be generated (such as different drop rates for energy objects) among the various clients that are participating within the same multiplayer video game.

In certain example embodiments, the acquisition of energy objects may increase the health of a vehicle. In certain examples, when the meter is full and/or the parameter can no longer be increased, then any further energy objects that are acquired may be used to increase the health parameter of the vehicle. In certain example embodiments, the acquisition of energy objects may increase the speed of a vehicle. In certain examples, when the meter is full and/or the parameter can no longer be increased, then any further energy objects that are acquired may be used to increase the top speed or provide a temporary speed boost. For example, each energy object that is acquired may temporarily increase the speed of the vehicle by 10 kph—which may be above an otherwise set top speed for the vehicle.

In certain example embodiments, as the parameter is increased the top speed of the vehicle may be correspondingly gradually increased. As an illustrative example, when the parameter is zero, the top speed may be 500 kph. However, increasing the parameter may increase the top speed by up to 10 kph more (e.g., when the meter is "full"). This increase may be gradual and linked to how the parameter is increased-such that the top speed increases linearly, exponentially, logarithmically, or via other calculation. Accordingly, in certain examples, benefits or the like may be achieved from acquiring energy objects that are separate from a special ability or the like that is triggered or activated.

In certain example embodiments, when the special ability is activated the game processing may provide for one or more additional ways to extend the time the ability is active. In some examples, colliding with vehicles (whether other race participants or non-race NPCs) may add additional time to the timer associated with the ability. While Super turbo-bumping into others adds extra time; Drain meter over time.

In certain example embodiments, the special ability meter and the parameter/value that is tracked for that meter may be used as a separate boost or turbo. As noted herein, meter 112 may be used in connection with provided a turbo boost or the list. This may be a first turbo boost that a player can activate. Charge meter 114 may be used to activate another type of turbo only when meter 114 is fully charged. The use or activation of the second type of turbo may be tied to the length of a timer.

Figure 10:
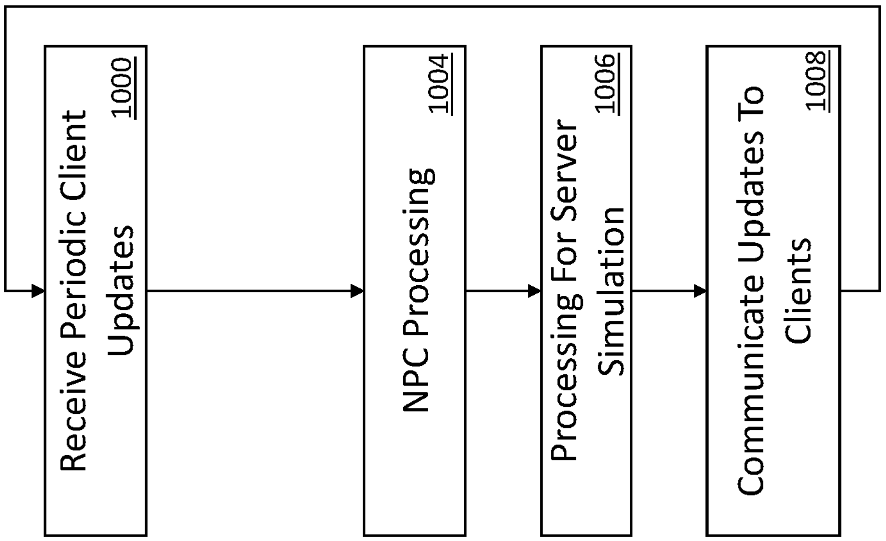
FIG. 10 is a flow chart of a process that may be executed on a server computer system for the multiplayer video game shown in FIG. 1 according to certain example embodiments.

Description Of FIG. 10: Server Processing

FIG. 10 is a flow chart of a process that may be executed on a server computer system for the multiplayer video game shown in FIG. 1 according to certain example embodiments. The processing shown in FIG. 10 may be executed as part of (or be) the processing shown in FIG. 8 for the execution of the server processing 800.

Once a new game instance has been created and the race has started, the processing shown in FIG. 10 may be performed.

At 1000, updates that are sent from clients 610 are processed. The updates at 1000 may include those periodic updates provided by clients 610 that include the movement information, user input device information and the like. These updates may be communicated by clients on a periodic basis to provide the server with updates to how the player-controlled object associated with that client is moving/performing within the game space.

Updates that are termed significant event updates may also be received from one or more clients 610. These updates relate to events that occur on the client that are significant and are communicated outside of the normal periodic updates. Examples of significant events may include: 1) activating a special power (e.g., that a vehicle has moved or is moving the second track); and 2) collisions by the player-controlled object to another player object that causes at least one of the objects involved in the collision to be destroyed (e.g., because the health of the vehicle will drop to zero or below).

At 1004, any NPC processing is performed by the server 602. This may include determining whether to generate an NPC and where the NPC should be located within the race. This information (e.g., the creation of the NPC and its location) may thereafter be communicated to each client. The clients may then handle moving or otherwise controlling the NPC without relying upon updates for such control from the server. In some examples, the NPC processing 1004 may include determining when to remove NPCs from the game world (and subsequently communicating as such to the clients). In some examples, the NPC processing 1004 may include determining how the one or more NPCs or the like are to move or act within the game space and then communicating such information to the clients.

If there are AI players/vehicles within the race, then the NPC processing may include determining how to control the movement of the AI players within the game. As noted herein, there may be different processing performed for different types of difficulty levels that are associated with the AIs. The generated commands for the AI players may control how those vehicles move in the simulation maintained by the server and also be communicated to each client.

At 1006, the simulation of the game that is maintained by the server computer system 602 is updated. More specifically, the server 602 maintains (similar to the clients) a game state that includes the position and other attribute information related to each of the vehicles within the race. The processing performed at 1006 may update this game state based on the data received from the clients and any other processing (e.g., related to NPCs or other aspects within the race).

As discussed herein, the processing performed by the server and the processing performed by a client (or each client) may be different. In certain example embodiments, a difference between the processing performed for the multiplayer game and the server may be the generation of energy objects. In certain example embodiments, the generation of energy objects is not synchronized between the clients and server. Accordingly, in the simulation of the game that is maintained by the server, the server may determine collisions and generate energy objects in a manner that is the same as or modified from that performed on the clients. However, it will be appreciated that each client may still exclusively handle their own energy objects such that the server does not "know" where such energy objects may be located (or that they have been generated) on the track (or within the game space) for a given client. Similarly, in certain example embodiments, the acquisition of energy objects is exclusively handled by each respective client and not synchronized to the server. This approach can save bandwidth as the server does not need to update clients or receive information from clients regarding energy objects. Rather, the processing for these features may be pushed or otherwise offloaded to the respective clients according to certain example embodiments.

It will be appreciated that the acquisition of energy objects by AI players may be modified from that handled on clients. This may be because when energy objects are generated on a client, there is only 1 vehicle that is seeking to acquire those energy objects—the vehicle that is being controlled by the user playing the game. In contrast, if there are multiple AI vehicles, they may all compete for the same energy objects on the simulation maintained by the server. To account for this, in certain examples, the value received from acquisition of energy objects by AI players may be increased vs that provided to vehicles on clients.

In certain examples, when an AI player is a Rival to a player, it may automatically obtain energy from energy objects if it is too far behind. This may be performed to make the race closer among the players that are Rivals (including AI players). Conversely, if an AI player is ahead of Rivals, then the tracked parameter may automatically decrease for that AI player.

Another aspect that may not be tracked on the server is the state of the tracked parameter for each client (as shown in meter 114). Rather this value may be maintained and stored on each client. In certain examples, the value for the tracked parameter may be provided to the server during the periodic updates. In other examples, events related to acquiring an energy object (and/or the increase of a value of the tracked parameter) may be communicated to the server (e.g., as a significant event).

Note that while collision processing is performed by clients (e.g., at 912), that such collision processing may not be similarly performed by the server 602. However, in certain examples, collision processing may also be performed by the server (e.g., to determine/modify the positional/movement data of the involved vehicles). Such collision processing may also be used to generate energy objects as discussed in connection with the client processing. For example, the server may determine when collisions occur in order to generate energy objects that may be acquired by AI players that are being controlled by the server.

In some examples, collision processing may be performed by the server (e.g., at or in connection with 1006) only based on the determination of one or more conditions. In illustrative example of such a condition is when a collision is determined to reduce the health of a vehicle involved in the collision to 0. This may be communicated to the server via a significant event update. The server may then determine whether the collision occurs or not.

As an example, the client for a first vehicle may determine that the first vehicle collides with a second vehicle. However, the client for the second vehicle may not determine that the first vehicle collided with the second vehicle. The difference may be due to the latency, or other factors, involved in communicating positional updates and the like. Accordingly, the position of the second vehicle that is tracked in the client thereof may (and likely will) be different at the same "time" than the position of the second vehicle within the client of the first vehicle. In such a case the server 602 may handle/resolve this conflict. More specifically, when the client of the first vehicle determines that a collision occurs that results in reducing the health of the second vehicle to zero, the client of the first vehicle may communicate a significant event regarding that collision to the server. The server 602 may then determine (e.g., at 1006) whether the position of the second vehicle is determined to be at a location within the game space such that the first vehicle actually collided with the second vehicle (as determined by the server). If a collision is determined, then a message may be communicated to the client of the second vehicle (and other clients as well) that the second vehicle has been destroyed or the like. However, if the Server determines that a collision has not occurred then a message may be communicated back to the client of the first vehicle that the collision did not occur and that the health of the second vehicle did not decrease as a collision did not take place. Also included in this message may be any update to the movement, position, or other data regarding the second vehicle. As one example for why a collision may not have occurred, the user controlling the second vehicle may have activated the special ability (a significant event) to transport the second vehicle to the second track.

At 1008, the server generates and transmits any updates to the clients regarding the game state and/or the vehicles within the game. Such updates may include positional data, movement data, and health data for each vehicle within the race. The messages communicated to the clients will then be received by each client, which will then be incorporated into the client-side processing (e.g., as discussed in connection with FIG. 9).

In some examples, the communication of updates to clients at 1008 may be split into different types of processing for providing updates. One update provided to clients may be based on the occurrence of "significant events" and another update may be based on the periodic updates. In some examples, only data regarding the significant event may be communicated (e.g., just that a specific vehicle has activated a special ability. In some examples, when a significant event occurs and then triggers such communication (whether from a client to the server, or from the server to the clients), the data communicated for the periodic updates may be included in such an update.

As with the client-side processing (e.g., at 802 and/or FIG. 9), the processing shown in FIG. 10 may occur multiple times per second. The rate at which the processing is performed on the server 602 may be a "tick rate" or update rate or the like. This rate may correspond to the rate at which the server updates its own internal game state of the game that is being played. In some examples, this tick rate is the same or similar to that of the clients (e.g., 30 times per second), in other examples the tick rate may be faster (e.g., 100 times per second), and in other examples may be slower (e.g., 10 times per second).

Figure 11:
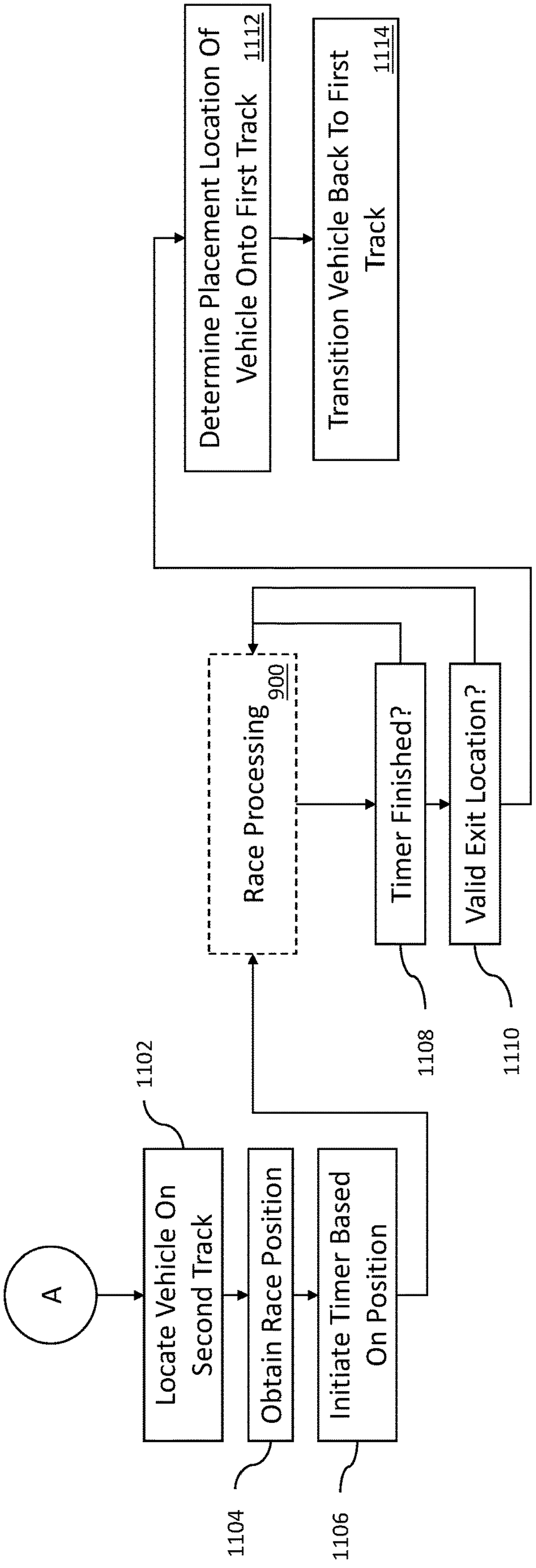
FIG. 11 is a flow chart showing processing that occurs for the multiplayer video game shown in FIG. 1 when a player-controlled object uses a second track in a race according to certain example embodiments.

Description Of FIG. 11: Second Track Processing

FIG. 11 is a flow chart showing processing that occurs for the multiplayer video game shown in FIG. 1, and in connection with FIG. 9, when a player activates or transfers their vehicle to a second track in the race according to certain example embodiments. The processing shown in FIG. 11 occurs in response to reception of a triggering instruction at 920 from FIG. 9.

If the condition(s) for activation for the special ability are satisfied (e.g., the threshold for the special ability meter has been meet and the player has provided an activation instruction), then the processing transfers via "A" in FIG. 9, and the elements shown in FIG. 11 are performed. At 1102, the player's vehicle 102 is transported or otherwise moved from the first track 104 to a second (e.g., different than the first) track 404. As part of this process, the location for where on the second track to place the vehicle is determined.

In certain example embodiments, the second track may be associated with or include preset locations on the second track at which vehicles that are entering the track may be located. Once one of these locations is selected the vehicle is located at the corresponding location of the second track. Selection of one of these locations may be based on, for example, the world space distance of the vehicle when it is on the first track to that point. In other words, the position on the second track that is the shortest to the position of the vehicle on the first track at which the special ability is activated.

In other examples, the first and second track may have a percentage completion that is stored for how far along into a given track a vehicle is located. When the special ability is activated, the vehicle may be placed onto the second track at the same percentage location. Thus, for example, if the first track and second track are different lengths (e.g., because the second track has less turns or the like), then the location may be at the 40% mark if the vehicle was 40% through the first track.

In certain example embodiments, the client performs the determination of where to locate the vehicle. However, in other examples, the server 602 performs determination of where to locate the vehicle on the second track. In certain example embodiments, the client may first communicate that the special ability has been activated. The server will receive this message and then perform a determination of where the vehicle should be placed on the second track. The server will then communicate the location to the client.

In addition to adjusting the location of the vehicle, the movement related data of the vehicle may be adjusted. As an example, the "direction" of the first and second track may not be parallel or overlap. Accordingly, the direction of movement of the vehicle may be adjusted to center the vehicle along the centerline of the second track when the transition occurs. Note that this difference may be noticeable in certain instances, and not in others. For example, if vehicle 102 were travelling towards the wall of the track in FIG. 1 and activated the special ability, the movement data for vehicle 102 may be adjusted so as not to head into a wall of the second track. Instead, the movement parameters of vehicle may be adjusted to match (for example), the direction shown in FIG. 4 for vehicle 102.

At 1104, in connection with movement of the vehicle 102 to the second track (e.g., warping the vehicle), the position of the vehicle 102 within the race may be determined. For example, the position of vehicle 102 may be the race position in FIG. 1 Is 49 out of 99 places and 7 of 99 in FIG. 4.

At 1106, the position of the vehicle 102 in the race is used to set or initiate a timer using the determined position of the vehicle 102 within the race. More specifically, the amount of time that the vehicle is allowed to remain on the second track may be determined or otherwise calculated based on the position of the vehicle 102 within the race. As a non-limiting illustrative example, the time may be set to be between 2 and 15 seconds and if there are 100 players in a race, then the timer may be set as 2+13*((racePosition−1)/100). Thus, the first placed player would have a timer of 2 seconds, the second placed player 2.13 seconds up the $100^{th}$ placed player at 15 seconds. Accordingly, the length of time that the timer for how long the special ability may be active may be a function of, or otherwise based on, the placement or ranking of the player-controlled object within the race. In certain examples, the distance between the player-controlled object and the first-place vehicle may be used to determine the length of time that the special ability timer can be active. In general, the length of the timer value may be increased the further back the activating vehicle is within the race.

In certain example embodiments, the position of the vehicle (or determination of the length of the timer) may be or based on any or all of the following: 1) the absolute position of the vehicle in the race; 2) the relative position of the vehicle in the race; 3), rank order in the race; 4) the distance (e.g., within the virtual game space) from where the first or top ranked vehicle is located within the race; 5) the position of the vehicle on the track (e.g., 25% percent complete vs 50% complete); 6) the absolute position of the vehicle on the track (e.g., at certain areas of the track); 7) the finishing position of the vehicle in a prior race; 7) the relative positioning of the vehicle to Rivals in the race In certain example embodiments, a combination of elements may be used to determine the position (or the timer value that is based on the position). For example, the rank position of the current vehicle (e.g., $4^{th}$ place) in combination with a distance from the leader or any other vehicle in the race.

In some examples, the relative positioning of vehicle 102 to their Rivals may be used to influence the timer length. For example, if vehicle 102 is in front of all 4 Rivals, then the timer may be less than for a vehicle that is behind all four Rivals. In some examples, the relative Rival placement (or distance to rivals) may be used in combination with the overall placement of the vehicle 102 within the race.

The timer that is calculated may be reflected in the special ability meter 114 by depleting the meter from its initial full state until it is empty. Thus, meter 114 will deplete faster for shorter timers and deplete over a longer period of time for longer timers.

In some examples, the timer is set once the vehicle enters the second track. Alternatively, in certain examples, the timer may be adjusted while the vehicle is on the second track. For example, if vehicle manages to pass all other vehicles to enter (for example) first place, then the timer may be reduced more quickly. Thus, the timer value may be adjusted based on updated race position data of the vehicle as it moves through the second track.

Once the vehicle is placed onto the second track and the timer activated, then the race processing 900 is performed (e.g., at a rate of 30 frames per second or other rate as designed). More specifically, updates are sent and received, game data is updated, and images are displayed as described in connection with FIG. 9.

As noted herein, one or more attributes of the second track may be different from the first track and/or parameters of the vehicle may be adjusted. The second track may have more speed boost features 410 (that boost the top the speed on vehicle-such as on a straightaway) than are present the first track. The second track may allow vehicles to move at a higher speed. In some examples, vehicles may take no damage (e.g., become invincible) or regeneration health on the second track. In some examples, no energy objects may be generated or acquired on the second track and/or no collisions may occur.

As race processing 900 is performed, the process continually checks if the timer for the second track that was initiated at 1106 has expired at 1108. If the timer continues, the race processing on the second track may continue.

When the timer is close to expiring (or has expired), a graphical notification may be displayed on the client. This may include having the second track flash or change color or the like.

If, however, the timer expires, then the process determines if the vehicle is at a location that allows for a valid return back to the first track. More specifically, as with the second track, the first track may have one or more predetermined entry locations. If the vehicle is at a location that is not valid (e.g., on the second track or first)—such that the location of the vehicle on the second track is not close enough (e.g., not within a threshold) to the entry location for the first track, then the vehicle may remain on the second track until that location is reached. In some examples, a valid transition point back to the first track may be when the second track overlaps the first track. In other words, transition back to the first track may only occur if the first track is "below" the second track (e.g., within the game space).

Accordingly, there may be two (or more) conditions for triggering the exit of a vehicle from the second track: 1) the expiration of the timer; 2) the location of the vehicle on the second track; and/or 3) a predicted entry location to the first track (e.g., the presence of a valid location on the first track).

If there is a valid exit location back to the first track, then the process determines the location at which the place (e.g., warp) the vehicle back on the first track at 1112 and then transitions the vehicle back to the first track at 1114.

The positioning of the vehicle on the first track may account for any vehicles that are already present on the track. For example, the location to which the vehicle will be moved will not be the same as a location of another vehicle (e.g., to avoid having the two collide). The position on the first track that is selected may be adjusted/calculated to avoid having the vehicle crash out right after returning to the first track.

While the techniques shown in FIG. 11 are related to moving between a first and second track, they may also be applied to moving between more than two tracks. For example, a user may select which of two alternative tracks to use and the second track may be one of those.

In other examples, the special ability activation may allow the vehicle to fly above the first track. Accordingly, the "second" track may instead be allowing the vehicle to fly about the first track.

In certain example embodiment, the techniques herein may be used in games and virtual spaces that do not include a track (or a path, course, of the like). As an illustrative example, a racing game may include a start position and an end position without a track or the like between the two. Such a racing game may allow players to find their own path between the two without necessarily following a track from the start to finish. An illustrative example may be a game that models a race between the New York (the start) and Los Angeles (the finish). This type of gameplay may allow for more freeform movement of vehicles between start and finish. In one game instance, most game players may take a southern path. In another instance, a northern path. And in another example, they may split between various paths to reach Los Angeles. With this type of gameplay, the use of a "second" track herein may still be provided. The second track may, similar to track 404, still have a defined track that the vehicle must follow. In other examples, the second track may likewise allow for free form movement of vehicles and still provide the benefits herein.

Figure 12:
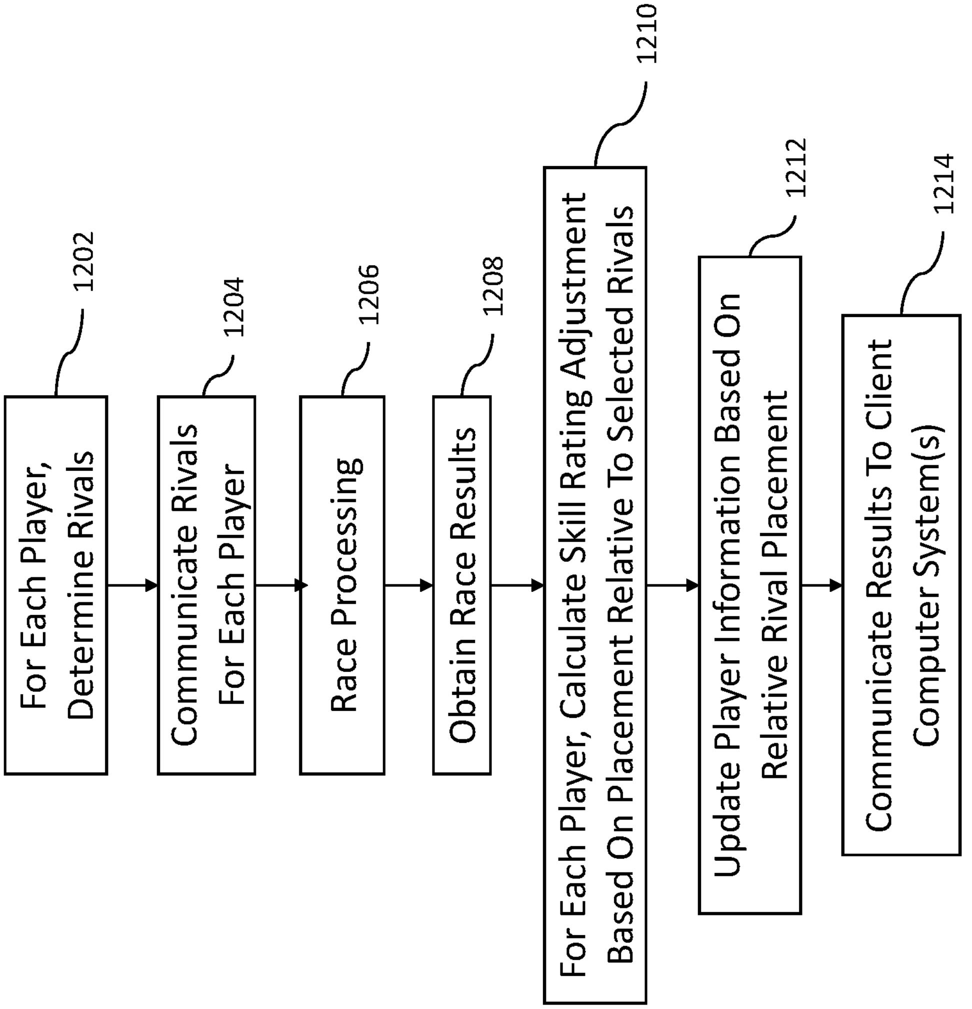
FIG. 12 is a flow chart showing processing that occurs for the multiplayer video game shown in FIG. 1 for how Rivals are selected and how player information is updated based on the results of the race according to certain example embodiments.

Description Of FIG. 12: Rivals Processing

FIG. 12 is a flow chart showing processing that occurs for the multiplayer video game shown in FIG. 1 for how Rivals are selected and how player information is updated based on the results of the race according to certain example embodiments. The processing shown in FIG. 12 may be performed by server 602 in certain example embodiment.

At 1202 (which may correspond to 714 from FIG. 7), Rivals are determined for each player that is participating in the race. The selection of for each player may occur once a lobby has been filled (708) and a game instance created for that lobby (710). The selection of Rival(s) for a race may be dependent or based on a rank or skill parameter that is stored in the Player DB 608.

In certain example embodiments, 4 Rivals may be selected for each player that is participating in a race. The selection of the 4 Rivals may include selecting 2 Rivals that have a higher ranking (e.g., those users that have the two immediate higher rankings) than the player and 2 Rivals have a lower ranking than the player (e.g., those users that have the two immediate lower rankings). If there are no, or not enough, lower/higher ranked players (e.g., because the player for which Rivals are being selected is the highest/lowest ranked player in the race), then additional lower/higher ranked players may be selected. As an illustrative example, the highest ranked player in a race may have Rivals that are the $2^{nd}$, $3^{rd}$, $4^{th}$, and $5^{th}$ ranked players in the race. Similarly, the $100^{th}$ ranked player (out of the 100 players in the race) may have the $96^{th}$, $97^{th}$, $98^{th}$, and $99^{th}$ ranked players as Rivals.

The determination of Rivals may include sorting the players into a sorted list based on the skill rating of each player before the start of the race. For example, if there are 100 players participating in a race, then the players may be sorted based on the skill rating acquired from the player DB 608. Once sorted, the Rivals are selected. In some examples, a sliding window approach may be used to select Rivals for each player. The window may include 5 different players (with the middle player being the player for which rivals are being selected) in the sorted list. With this approach most players will have a different group of Rivals that they will compete against than other players (with the exception of players 1-3 and the bottom 3 ranked players if 4 Rivals are selected per player).

In certain example embodiments, AI players and their respective vehicles may be included in the rival selection process. In such cases, the assigned value for a skill parameter for an AI player may be used in connection with sorting that AI player into the list. Accordingly, in certain examples, the Rivals for a player may include AI players that are controlled by the server. In certain example embodiments, AI players may be excluded or deprioritized in connection with selection of Rivals for players.

While the above example describes selecting 4 Rivals per player, other Rival amounts may be used. In certain example embodiments, one Rival is selected per player. In certain example embodiments, a different number of Rivals may be selected for different players. For example, the highest ranked player may have 5 rivals selected for that player. while the lowest ranked player in a race may have 2 (or 1).

In certain example embodiments, Rival information may change during the course of a race. For example, if a race around a track includes 4 laps around the track, then new Rivals may be generated for each lap (or every other lap). As an example, when a player finishes a lap, the process may select 4 new Rivals that are selected based on the current placement within the race.

In certain examples, if a first player drops from a race (e.g., disconnects or is otherwise removed from the race), then a replacement Rival may be automatically selected for any player that had the first player as a Rival. This selection may be based on the skill rating of the remaining players, the placement of current players within race, or a combination thereof. In certain examples, no replacement is selected if a Rival is removed mid-race. Instead, when player A disconnects, player A may finish last among any Rival group for any other player.

In some examples, the multiplayer video game may involve a circuit of races (e.g., a Grand Prix) that occur over the course of multiple consecutive races. For example, 4 different races may be performed in one circuit competition. In this mode, Rivals may be selected based on the skill rating in the first race, but then selected based on the current placement in the circuit (e.g., an overall ranking within that circuit) and/or placement in the prior race for that circuit.

As an illustrative example, the 25th ranked player (called "Player A" in this example) (by skill rating) in the first place may have Rivals that are the $23^{rd}$, $24^{th}$, $26^{th}$, and $27^{th}$ ranked skill rating players as Rivals for the first place. Player A then finishes in $10^{th}$ place in the first race of a 4-race circuit. In the second race, the Rivals for Player A are set as the players who finished $8^{th}$, $9^{th}$, $11^{th}$, and $12^{th}$ in the first race. Thus, the skill rating of the players is used for selecting Rivals in the first race, but the results of the first race are used to select Rivals for the second race. Player A then finishes $15^{th}$ in the second race and is ranked $8^{th}$ overall for the 4-race circuit (e.g., which may be based on a cumulative time of races 1 and 2 for example). For the third race, Rivals are selected as in the second race. Then for the third race, Player A finishes $8^{th}$ and is now ranked $4^{th}$ overall in the circuit. In the fourth and final Race of the circuit, the Rivals may be selected based on the overall circuit ranking (rather than just the results of the third race). Accordingly, different options for selecting Rivals for a given race may be used in certain examples. In certain examples, the same technique for selecting Rivals may be used in all races (e.g., skill rating, prior placement, overall placement, or the like).

In certain example embodiment, the group that includes the player and their rivals may be unique within the race (excepting the highest and lowest ranked users).

Once the Rivals for a player are selected, then information on the selected Rivals for that player is communicated to the respective client associated with that player at 1204.

Race processing is performed at 1206. This may correspond to the processing discussed in connection with FIG. 10 (at the server 602) and/or in FIG. 9 (at a client 610). As shown in FIG. 5, the information regarding Rivals may be displayed to players in different ways. This includes having different icons that identify vehicles of Rivals, a mini-leaderboard 510 that includes the Rivals of the current player, and showing Rivals differently on the mini map.

Once a race is complete, then the results of the race are obtained at 1208.

At 1210, the server calculates a skill rating adjustment based on the relative placement of each player to their selected Rivals. At 1212, the calculated skill adjustment is used to update the player's skill rating and this updated skill rating is then stored to the Player DB 608. In some instances, the calculation may result in an increase in the player's skill rating. In some instances, the calculation may result in a decrease in the player's skill rating. And in other instances, calculation may result in no change in the player's skill rating (e.g., the update to the player's skill rating may be 0 and/or not changed).

In certain example embodiments, the calculation of a skill rating adjustment may use skill algorithms such as Elo, Glicko, or Glicko 2 (or modified versions thereof). The rating adjustment may be designed to increase the skill rating of players when they finish a race ahead of at least one of their Rivals—with further increases in skill rating based on how many Rivals they finished ahead of. If a player did not finish a race ahead of any of their Rivals, then their corresponding skill rating may be decreased.

At 1214, the results of the skill rating adjustment may be communicated to a client. This may include the new skill rating and the amount of adjustment (whether an increase or decrease).

In certain example embodiments, an experience value may also be calculated for each user. The experience gained from the race may be based on the overall placement of the player in the race, the placement with respect to rivals thereof, or both. The experience parameter may also be stored as part of the player DB 608.

It will be appreciated that this technique for selecting Rivals allows a player to compete against a smaller subset of the competitors (which may include one or more NPC controlled vehicles in some instances) within a race. This technique may thus provide players with an increased experience within the race as opposed to just competing against tens or even hundreds of different competitors.

Figure 13:
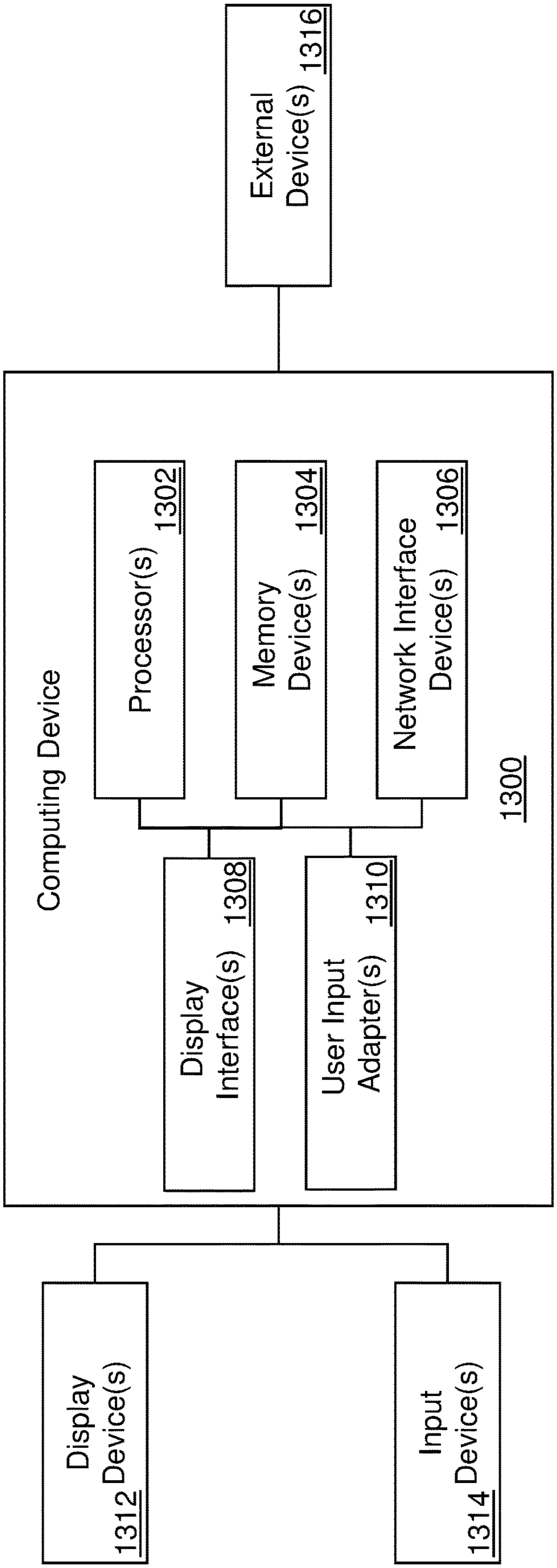
FIG. 13 shows an example computing device that may be used in some embodiments to implement features described herein.

Description Of FIG. 13: Example Computing Device

FIG. 13 is a block diagram of an example computing device 1300 (which may also be referred to, for example, as a "computing device," "computer system," or "computing system") according to some embodiments. In some embodiments, the computing device 1300 includes one or more of the following: one or more processors 1302 (which may be referred to as "hardware processors" or individually as a "hardware processor"); one or more memory devices 1304; one or more network interface devices 1306; one or more display interfaces 1308; and one or more user input adapters 1310. Additionally, in some embodiments, the computing device 1300 is connected to or includes a display device 1312. As will explained below, these elements (e.g., the processors 1302, memory devices 1304, network interface devices 1306, display interfaces 1308, user input adapters 1310, display device 1312) are hardware devices (for example, electronic circuits or combinations of circuits) that are configured to perform various different functions for the computing device 1300. In some embodiments, these components of the computing device 1300 may be collectively referred to as computing resources (e.g., resources that are used to carry out execution of instructions and include the processors (one or more processors 1302), storage (one or more memory devices 1304), and I/O (network interface devices 1306, one or more display interfaces 1308, and one or more user input adapters 1310). In some instances, the term processing resources may be used interchangeably with the term computing resources. In some embodiments, multiple instances of computing device 1300 may arranged into a distributed computing system.

In some embodiments, each or any of the processors 1302 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1302 uses an instruction set architecture such as x86 or Advanced RISC Machine (ARM). In some embodiments, each or any of the processors 1302 is or includes, for example, a graphical processing unit (GPU), which may be an electronic circuit designed to generate images and the like. One or more of the processors 1302 may be referred to as a processing system in certain examples.

In some embodiments, each or any of the memory devices 1304 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1302). Memory devices 1304 are an example of non-transitory computer-readable storage.

In some embodiments, each or any of the network interface devices 1306 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 1306 may include ports or other connections that enable such connections to be made and communicate data electronically among the various components of a distributed computing system.

In some embodiments, each or any of the display interfaces 1308 is or includes one or more circuits that receive data from the processors 1302, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1312, which displays the image data. Alternatively, or additionally, in some embodiments, each or any of the display interfaces 1308 is or includes, for example, a video card, video adapter, or graphics processing unit (GPU). In other words, the each or any of the display interfaces 1308 may include a processor therein that is used to generate image data. The generation or such images may occur in conjunction with processing performed by one or more of the processors 1302.

In some embodiments, each or any of the user input adapters 1310 is or includes one or more circuits that receive and process user input data from one or more user input devices (1314) that are included in, attached to, or otherwise in communication with the computing device 1300, and that output data based on the received input data to the processors 1302. Alternatively, or additionally, in some embodiments each or any of the user input adapters 1310 is or includes, for example, a PS/2 interface, a USB interface, a touchscreen controller, or the like; and/or the user input adapters 1310 facilitates input from user input devices 1314.

In some embodiments, the display device 1312 may be a Liquid Crystal Display (LCD) display, Light Emitting Diode (LED) display, or other type of display device. In embodiments where the display device 1312 is a component of the computing device 1300 (e.g., the computing device and the display device are included in a unified housing), the display device 1312 may be a touchscreen display or non-touchscreen display. In embodiments where the display device 1312 is connected to the computing device 1300 (e.g., is external to the computing device 1300 and communicates with the computing device 1300 via a wire and/or via wireless communication technology), the display device 1312 is, for example, an external monitor, projector, television, display screen, etc.

In some embodiments, each or any of the input devices 1314 is or includes machinery and/or electronics that generates a signal that is provided to the user input adapter(s) 1310 in response to physical phenomenon. Examples of input devices 1314 include, for example, a keyboard, a mouse, a trackpad, a touchscreen, a button, a joystick, a sensor (e.g., an acceleration sensor, a gyro sensor, a temperature sensor, and the like). In some examples, one or more input devices 1314 generate signals that are provided in response to a user providing an input—for example, by pressing a button or actuating a joystick. In other examples, one or more input devices generate signals based on sensed physical quantities (e.g., such as force, temperature, etc.). In some embodiments, each or any of the input devices 1314 is a component of the computing device (for example, a button is provided on a housing that includes the processors 1302, memory devices 1304, network interface devices 1306, display interfaces 1308, user input adapters 1310, and the like).

In some embodiments, each or any of the external device (s) 1316 includes further computing devices (e.g., other instances of computing device 1300) that communicate with computing device 1300. Examples may include a server computer, a client computer system, a mobile computing device, a cloud-based computer system, a computing node, an Internet of Things (IoT) device, etc. that all may communicate with computing device 1300. In general, external devices(s) 1316 may include devices that communicate (e.g., electronically) with computing device 1300. As an example, computing device 1300 may be a game device that communicates over the Internet with a server computer system that is an example of external device 1316. Conversely, computing device 1300 may be a server computer system that communicates with a game device that is an example external device 1316.

In various embodiments, the computing device 1300 includes one, or two, or three, four, or more of each or any of the above-mentioned elements (e.g., the processors 1302, memory devices 1304, network interface devices 1306, display interfaces 1308, and user input adapters 1310). Alternatively, or additionally, in some embodiments, the computing device 1300 includes one or more of: a processing system that includes the processors 1302; a memory or storage system that includes the memory devices 1304; and a network interface system that includes the network interface devices 1306. Alternatively, or additionally, in some embodiments, the computing device 1300 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 1302 and the network interface devices 1306; or the single SoC (or the multiple SoCs) may include the processors 1302, the network interface devices 1306, and the memory devices 1304; etc.

The computing device 1300 may be arranged in some embodiments such that: the processors 1302 include a multi or single-core processor; the network interface devices 1306 include a first network interface device (which implements, for example, WiFi, Bluetooth, NFC, etc.) and a second network interface device that implements one or more cellular communication technologies (e.g., 3G, 4G LTE, CDMA, etc.); the memory devices 1304 include RAM, flash memory, or a hard disk. As another example, the computing device 1300 may be arranged such that: the processors 1302 include two, three, four, five, or more multi-core processors; the network interface devices 1306 include a first network interface device that implements Ethernet and a second network interface device that implements WiFi and/or Bluetooth; and the memory devices 1304 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client 610 (610*a*-610*n*), server system 602, game program 650, lobby module 604, race module 606, each of which will be referred to individually for clarity as a "component" for the remainder of this paragraph, are implemented using an example of the computing device 1300 of FIG. 13. In such embodiments, the following applies for each component: (a) the elements of the 1300 computing device 1300 shown in FIG. 13 (i.e., the one or more processors 1302, one or more memory devices 1304, one or more network interface devices 1306, one or more display interfaces 1308, and one or more user input adapters 1310), or appropriate combinations or subsets of the foregoing, with or without the one or more display devices 1312, one or more input devices 1314, and/or external devices 1316) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1304 (e.g., in various embodiments, in a volatile memory device such as a RAM or an instruction register and/or in a non-volatile memory device such as a flash memory or hard disk) and all actions described herein as performed by the software modules are performed by the processors 1302 in conjunction with, as appropriate, the other elements in and/or connected to the computing device 1300 (e.g., the network interface devices 1306, display interfaces 1308, user input adapters 1310, display device(s) 1312, input device(s) 1314, and/or external device(s) 1316); (c) alternatively or additionally, to the extent it is described herein that the component processes and/or otherwise handles data, in some embodiments, such data is stored in the memory devices 1304 (e.g., in some embodiments, in a volatile memory device such as a RAM and/or in a non-volatile memory device such as a flash memory or hard disk) and/or is processed/handled by the processors 1302 in conjunction, as appropriate, the other elements in and/or connected to the computing device 1300 (e.g., the network interface devices 1306, display interfaces 1308, user input adapters 1310, display device 512, input device(s) 1314, and/or external device(s) 1316); (d) alternatively or additionally, in some embodiments, the memory devices 1302 store instructions that, when executed by the processors 1302, cause the processors 1302 to perform, in conjunction with, as appropriate, the other elements in and/or connected to the computing device 1300 (e.g., the memory devices 1304, network interface devices 1306, display interfaces 1308, user input adapters 1310, display device(s) 512, input device(s) 1314, and/or external device(s) 1316), each or any combination of actions described herein as performed by the component and/or by any software modules described herein as included within the component.

The hardware configurations shown in FIG. 13 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 13, (e) via other hardware arrangements, architectures, and configurations, and/or via combinations of the technology described in (a) through (e).

Technical Advantages of Described Subject Matter

In certain example embodiment, techniques for implementing multiplayer video games that have, for example, a large number of users are provided. The techniques include processing certain types of interactions for the multiplayer game entirely (or mostly) within a local simulation of a given client. These individual simulations may be different even though each client is part of the "same" multiplayer game. This approach advantageously allows for not having to completely synchronize every aspect of the multiplayer game across the tens or even hundreds of different simulations that are being executed across the various clients that are participating in the same game. The technical advantage of this approach advantageously provides for not transmitting data regarding certain events—while still providing concurrent gameplay across the various clients of the multiplayer video game.

In certain example embodiment, collisions between player objects in a multiplayer video are used to generate items that can be picked up within the game. These items can be used to activate a special ability. In some examples, the determination of when to generate these items and handling of when to pickup such items is not communicated as an event from the client to the server as part of the multiplayer game. However, the local results of such process are stored and used to control aspects of the multiplayer game.

In certain example embodiments, a race game includes a secondary track that a player can switch to during a racing game. The amount of time that the player is allowed to stay on this track is based on the positioning of the player's object within the race.

In certain example embodiments, a select group of players are dynamically selected for a competing player in a larger race. Different graphical indications are used during the race for players in this group and a skill rating for the player is based on race results in comparison to the select group as opposed to the results in the larger race.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although process steps, algorithms or the like, including without limitation with reference to FIGS. 7-12, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computing device for playing a multiplayer video game, the computing device comprising:
- at least one hardware processor configured to perform operations comprising:
  - processing input that has been provided by a user of the computing device;
  - generating a virtual game space that includes a first track and a plurality of controlled virtual objects that include 1) a plurality that are controlled by other players that participate in the multiplayer video game using other computing devices, and 2) a player-controlled virtual object that is controlled by the user;
  - based on determination that a collision has occurred between two or more of the plurality of controlled virtual objects, generate a second object and locate the second object on the first track within the virtual game space;
  - based on controlling the player-controlled virtual object using the input, acquiring the second object for the player-controlled virtual object;
  - updating a parameter based on acquisition of the second object; and
  - controlling activation of a timer based on the parameter reaching a threshold amount, wherein when the timer is activated it is set for a length of time that is based on a position of the player-controlled virtual object in the multiplayer video game.

2. The computing device of claim 1, wherein the operations further comprise activating an ability for the player-controlled virtual object, wherein the amount of time that the ability is active is based on the length of time of the timer.

3. The computing device of claim 2, wherein the ability provides a benefit to the player-controlled virtual object in the multiplayer video game.

4. The computing device of claim 3, wherein the operations further comprise:
- for at least the length of time that the timer is active, setting a top movement speed for the player-controlled virtual object that is higher than the first track.

5. The computing device of claim 3, wherein the operations further comprise:
- switching between first and second modes, wherein the first mode confines control of the player-controlled virtual object to within the first track, wherein the second mode allows control of the player-controlled virtual object to fly outside of the first track,
- wherein activation of the ability switches from the first mode to the second mode.

6. The computing device of claim 1, wherein the operations further comprise:
- based on to an instruction provided by the user, moving the player-controlled virtual object to a second track that is different from the first track,
- based on expiration of the timer, moving the player-controlled virtual object back to the first track from the second track.

7. The computing device of claim 6, wherein the player-controlled virtual object remains on the second track after expiration of the timer, wherein the operations further comprise:
- determining a valid location on the first track to locate the player-controlled virtual object for when the player-controlled virtual object is moved back to the first track.

8. The computing device of claim 7, wherein the operations further comprise:

determining that there is not a current valid location on the first track for locating the player-controlled virtual object thereon, wherein moving the player-controlled virtual object back to the first track from the second track occurs is further based on determination of the valid location.

9. The computing device of claim 1, wherein the multiplayer video game is a racing game and the length of time that the timer is active is further based on a race position of the player-controlled virtual object in the racing game.

10. The computing device of claim 9, wherein the length of time is increased based on the race position of the player-controlled virtual object being lower.

11. The computing device of claim 1, wherein the operations further comprise:

communicating with a server computer system that is hosting the multiplayer video game, the communications including reception of updates for the plurality that are controlled by other players, and transmission of updates to the server computer system regarding the player-controlled virtual object.

12. The computing device of claim 11, wherein the determination that the collision that occurred between the two or more of the plurality of controlled virtual objects is not communicated to the server computer system.

13. The computing device of claim 11, wherein generation of the second object is not communicated to the server computer system.

14. The computing device of claim 11, wherein acquisition of the second object by the player-controlled virtual object is not communicated to the server computer system.

15. The computing device of claim 1, wherein the multiplayer video game is a racing game, wherein the operations further comprise:

displaying a non-player object; and generating, from the non-player object, additional objects that are the same type as the second object, wherein a rate at which the additional objects are generated is based on a race position of the player-controlled virtual object in the racing game.

16. The computing device of claim 1, wherein an amount that is added to the parameter based on acquisition of the second object is variable.

17. The computing device of claim 1, wherein the length of time is further based on the position, within the virtual game space, of the player-controlled object relative to a position, within the virtual game space, of at least one other one of the plurality of controlled virtual objects.

18. A computer program product stored to a non-transitory computer readable storage medium, the computer program product comprising instructions that are configured to cause at least one hardware processor of a computing device to perform operations comprising:

processing input that has been provided by a user of the computing device that is participating in a multiplayer video game;

generating a virtual game space that includes a first track and a plurality of controlled virtual objects that include 1) a plurality that are controlled by other players that participate in the multiplayer video game using other computing devices, and 2) a player-controlled virtual object that is controlled by the user;

based on a determination that a collision has occurred between two or more of the plurality of controlled virtual objects, generate a second object and locate the second object on the first track within the virtual game space;

based on controlling the player-controlled virtual object using the input, acquiring the second object for the player-controlled virtual object;

updating a parameter based on acquisition of the second object; and controlling activation of a timer based on the parameter reaching a threshold amount, wherein when the timer is activated it is set for a length of time that is based on a position of the player-controlled virtual object in the multiplayer video game.

19. The computer program product of claim 18, wherein the multiplayer video game is a racing game and the length of time that the timer is active is further based on a race position of the player-controlled virtual object in the racing game, wherein the operations further comprise:

based on to an instruction provided by the user, moving the player-controlled virtual object to a second track that is different from the first track, based on expiration of the timer, moving the player-controlled virtual object back to the first track from the second track.

20. A method that is performed on a computing device that communicates with a server computer system, the method comprising:

processing input that has been provided by a user of the computing device that is participating in a multiplayer video game;

generating a virtual game space that includes a first track and a plurality of controlled virtual objects that include 1) a plurality that are controlled by other players that participate in the multiplayer video game using other computing devices, and 2) a player-controlled virtual object that is controlled by the user;

based on a determination that a collision has occurred between two or more of the plurality of controlled virtual objects, generate a second object and locate the second object on the first track within the virtual game space;

based on controlling the player-controlled virtual object using the input, acquiring the second object for the player-controlled virtual object;

updating a parameter based on acquisition of the second object; and controlling activation of a timer based on the parameter reaching a threshold amount, wherein when the timer is activated it is set for a length of time that is based on a position of the player-controlled virtual object in the multiplayer video game.

* * * * *